(12) United States Patent
Zhou et al.

US011256903B2

(10) Patent No.: US 11,256,903 B2
(45) Date of Patent: Feb. 22, 2022

(54) IMAGE PROCESSING METHOD, IMAGE PROCESSING DEVICE, COMPUTER READABLE STORAGE MEDIUM AND ELECTRONIC DEVICE

(71) Applicant: GUANGDONG OPPO MOBILE TELECOMMUNICATIONS CORP., LTD., Guangdong (CN)

(72) Inventors: Haitao Zhou, Guangdong (CN); Ziqing Guo, Guangdong (CN); Kamwing Au, Guangdong (CN); Fangfang Hui, Guangdong (CN); Xiao Tan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 258 days.

(21) Appl. No.: 16/740,914

(22) Filed: Jan. 13, 2020

(65) Prior Publication Data

US 2020/0151425 A1    May 14, 2020

Related U.S. Application Data

(63) Continuation of application No. PCT/CN2019/080428, filed on Mar. 29, 2019.

(30) Foreign Application Priority Data

Apr. 12, 2018  (CN) .......................... 201810326586.9
Apr. 12, 2018  (CN) .......................... 201810326603.9
Apr. 12, 2018  (CN) .......................... 201810327216.7

(51) Int. Cl.
*G06K 9/00*       (2006.01)
*H04N 5/33*       (2006.01)

(52) U.S. Cl.
CPC ..... *G06K 9/00255* (2013.01); *G06K 9/00906* (2013.01); *H04N 5/33* (2013.01)

(58) Field of Classification Search
CPC .......... G06K 9/00255; G06K 9/00906; G06K 9/00288; G06K 9/00771; G06K 9/00342;
(Continued)

(56) References Cited

U.S. PATENT DOCUMENTS 8,831,295 B2    9/2014  Coons
2011/0025827 A1  2/2011  Shpunt et al.
(Continued)

FOREIGN PATENT DOCUMENTS

CN    103268608 A    8/2013
CN    105184246 A    12/2015
(Continued)

OTHER PUBLICATIONS

OA with English translation dated Feb. 22, 2019 for CN application 201810326586.9.
(Continued)

*Primary Examiner* — Nimesh Patel
(74) *Attorney, Agent, or Firm* — Young Basile Hanlon & MacFarlane, P.C.

(57) ABSTRACT

An image processing method, an image processing device, a computer readable storage medium and an electronic device are disclosed. The method includes: operating a camera module to acquire a target image in response to a first processing unit receiving an image acquisition instruction; and performing a predetermined processing on the target image.

18 Claims, 17 Drawing Sheets

(58) Field of Classification Search
CPC .......... G06K 9/00335; G06K 9/00369; G06K 9/2081; G06K 9/3241; G06K 9/00201; G06K 9/00362; G06K 9/2018; G06K 2009/3291; G06K 9/00778; G06K 9/44; G06K 9/00208; G06K 9/00624; G06K 9/00295; G06K 9/00765; G06K 9/4642; G06K 9/6292; G06K 2009/00932; G06K 9/00597; G06K 9/00577; G06K 9/00087; G06K 9/00885; G06K 9/00899; G06K 9/00604; G06K 9/036; G06K 9/00617; G06K 9/46; G06K 9/00114; G06K 9/00281; G06K 9/4604; G06K 9/6255; G06K 9/00302; G06K 9/4647; G06K 9/4671; G06K 9/52; G06K 9/0071; G06K 9/00671; G06K 9/62; G06K 9/6217; G06K 9/6262; G06K 9/6263; G06K 9/6288; G06K 19/045; G06K 19/06056; G06K 19/06075; G06K 9/00127; G06K 9/0014; G06K 9/00221; G06K 9/00228; G06K 9/00268; G06K 2209/401; G06K 9/00261; G06K 9/00248; G06K 9/00275; G06K 9/00214; G06K 9/0061; G06K 9/4614; G06K 9/6201; G06K 2009/00322; G06K 9/00013; G06K 9/00422; G06K 9/00744; G06K 9/00892; G06K 9/20; G06K 9/2027; G06K 9/4661; H04N 5/33; H04N 13/204; H04N 7/181; H04N 13/20; H04N 7/188; H04N 13/00; H04N 5/232; H04N 5/23219; H04N 9/3179; H04N 13/239; H04N 13/246; G06T 7/20; G06T 7/246; G06T 2207/10028; G06T 2207/10021; G06T 7/285; G06T 1/0007; G06T 7/73; G06T 2207/30232; G06T 2207/10024; G06T 2207/30004; G06T 7/0002; G06T 7/0014; G06T 7/292; G06T 7/0012; G06T 7/90; G06T 2207/10048; G06T 7/13; G06T 2207/20084; G06T 7/70; G06T 7/80; G06T 2207/20212; G06T 7/00; G06T 7/97; G06T 2200/24; G06T 19/20; G06T 17/00; G06T 2207/20112; G06T 2207/30244; G06T 17/05; G06T 2207/10012; G06T 2207/10016; G06T 2207/10132; G06T 7/521; G06T 7/586; G06T 7/593; G06T 7/74; G06T 5/50; G06T 2207/10088; G06T 2207/20224; G06T 3/608; G06T 7/0016; G06T 7/254; G06T 7/30; G06T 7/37; G06T 7/62; G06T 2207/30201; G06T 2200/28; G06T 2219/024; G06T 13/40; G06T 7/33; G06T 7/55; G06T 2207/20221; G06T 13/20; G06T 2207/10004; G06T 2207/10052; G06T 2207/10152; G06T 2207/20081; G06T 2207/20132; G06T 5/003; G06T 7/50; G06Q 20/40145; G06Q 20/105; G06Q 20/1085; G06Q 20/18; G06Q 20/308; G06Q 20/32; G06Q 20/3255; G06Q 20/3825; G06Q 20/384; G06Q 20/386; G06Q 20/40; G06F 16/168; G06F 21/32; G06F 16/164; G06F 16/248; G06F 16/50; G06F 3/04815; G06F 13/00; G06F 3/0304; G06F 3/0428; G06F 17/18; G06F 1/1645; G06F 3/0233; G06F 3/0236; G06F 3/0425; G06F 3/04842; G06F 3/04845; G06F 3/14; G06F 3/0481; G06F 21/6245; G06F 21/00; G06F 2221/2113; G06F 3/016; G06F 3/0484; G02B 2027/0187; G02B 2027/0138; G02B 5/30; G02B 19/009; G02B 2027/011; G02B 2027/0134; G02B 5/1842; G02B 5/23; G02B 5/28; G02B 6/0038; G02B 2027/014; G02B 2027/0127; G06N 20/00; G06N 3/006; G06N 3/02; G06N 3/0445; G06N 3/0454; G06N 3/0472; G06N 3/088; G06N 3/126; G06N 7/005

See application file for complete search history.

(56) References Cited

U.S. PATENT DOCUMENTS

| | | | |
|---|---|---|---|
| 2013/0135081 A1* | 5/2013 | McCloskey | A63F 13/71 340/5.8 |
| 2013/0251215 A1 | 9/2013 | Coons | |
| 2013/0271574 A1 | 10/2013 | Dorrance et al. | |
| 2016/0117544 A1* | 4/2016 | Hoyos | G06K 9/00604 348/78 |
| 2017/0366798 A1 | 12/2017 | Bae et al. | |
| 2018/0061056 A1* | 3/2018 | Zhao | G06K 9/2036 |
| 2018/0137620 A1* | 5/2018 | Gatto | G06K 9/00885 |
| 2018/0196998 A1* | 7/2018 | Price | G06K 9/00255 |

FOREIGN PATENT DOCUMENTS

| | | | |
|---|---|---|---|
| CN | 105224924 | A | 1/2016 |
| CN | 105373924 | A | 3/2016 |
| CN | 105513221 | A | 4/2016 |
| CN | 106161907 | A | 11/2016 |
| CN | 106200891 | A | 12/2016 |
| CN | 106210568 | A | 12/2016 |
| CN | 106407914 | A | 2/2017 |
| CN | 106446798 | A | 2/2017 |
| CN | 106682522 | A | 5/2017 |
| CN | 107169483 | A | 9/2017 |
| CN | 206470834 | U | 9/2017 |
| CN | 107292283 | A | 10/2017 |
| CN | 107341481 | A | 11/2017 |
| CN | 107424187 | A | 12/2017 |
| CN | 107592449 | A | 1/2018 |
| CN | 107832677 | A | 3/2018 |
| CN | 108549867 | A | 9/2018 |
| CN | 108564032 | A | 9/2018 |
| CN | 108573170 | A | 9/2018 |
| WO | 2016107638 | A1 | 7/2016 |
| WO | 2018051336 | A1 | 3/2018 |

OTHER PUBLICATIONS

OA with English translation dated Jul. 3, 2019 for CN application 201810326586.9.
ISR with English translation for PCT application PCT/CN2019/080428.
Notification of Registration with English translation CN 201810326586.9.
OA with English translation dated May 8, 2019 for CN application 201810326603.9.
OA with English translation dated May 13, 2019 for CN application 201810327216.7.
OA with English translation dated Oct. 14, 2019 for CN application 201810327216.7.
Chinese Decision on Rejection with English Translation for CN Application 201810326603.9 dated Sep. 24, 2019. (19 pages).
Chinese Office Action with English Translation for CN Application 201810326603.9 dated Apr. 3, 2020. (9 pages).
Indian Examination Report for IN Application 202017002794 dated Jun. 18, 2021. (7 pages).
Search report for EP application 19784735.3 dated Oct. 22, 2020.

* cited by examiner

02 — a first processing unit operates a camera module to acquire a target image in response to receiving an image acquisition instruction.

04 — a predetermined processing is performed on the target image.

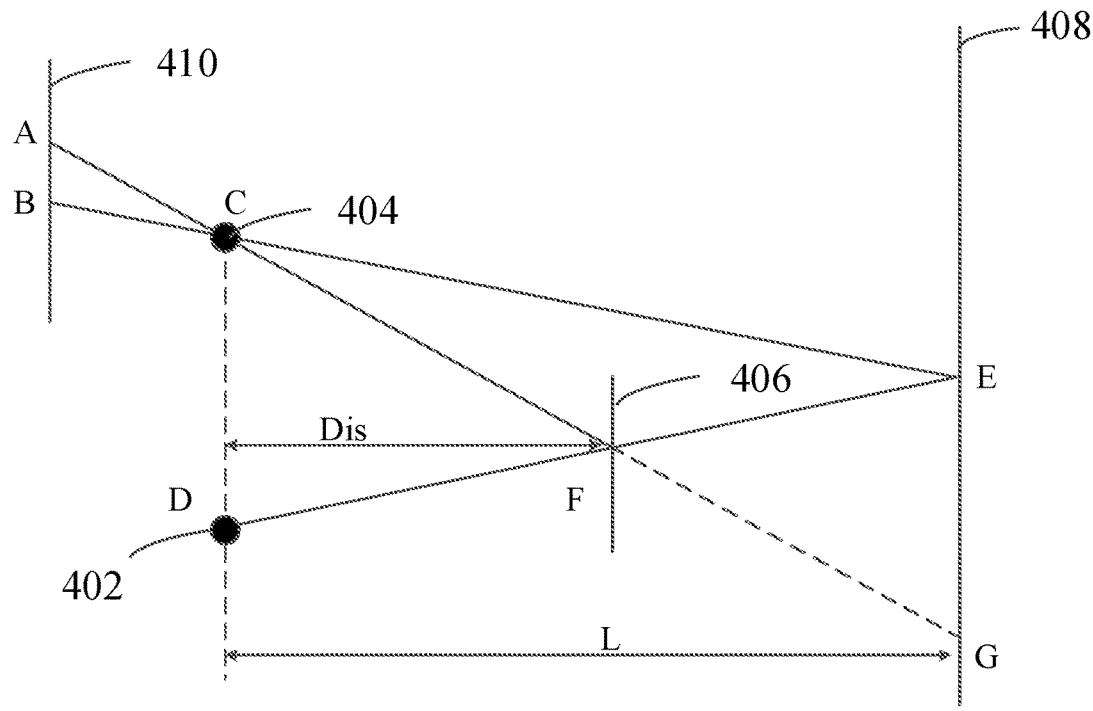

FIG. 5

```
                                              ┌─ 502
The first processing unit obtains a time stamp included in the image acquisition
                              instruction.
```

```
                                              ┌─ 504
The camera module is operated to acquire the infrared image at the first time point,
  in which the time interval between the first time point and the time stamp is less
                         than a second threshold.
```

```
                                              ┌─ 506
  The camera module is operated to acquire the speckle image at the second time
point, in which the time interval between the second time point and the time stamp
                         is less than a third threshold.
```

FIG. 6

IMAGE PROCESSING METHOD, IMAGE PROCESSING DEVICE, COMPUTER READABLE STORAGE MEDIUM AND ELECTRONIC DEVICE

CROSS-REFERENCE TO RELATED APPLICATION(S)

The present application is a continuation application of PCT application No. PCT/CN2019/080428, filed on Mar. 29, 2019, which claims priorities and benefits to Chinese Patent Application No. 201810326586.9, Chinese Patent Application No. 201810326603.9 and Chinese Patent Application No. 201810327216.7, all filed on Apr. 12, 2018, the disclosures of all of which are incorporated herein by reference in their entireties.

TECHNICAL FIELD

The present disclosure relates to a technical field of image processing, and more particularly, to an image processing method, an image processing device, a computer readable storage medium and an electronic device.

BACKGROUND

Due to the uniqueness of the human face, face recognition technology is more and more widely used in intelligent terminals. Many applications in the intelligent terminals require authentication with a human face, for example, unlocking the intelligent terminal with a face, performing payment authentication with a face, and the like. Meanwhile, the intelligent terminal may also process images containing a human face, e.g., recognizing a facial feature to make an emoticon according to a facial expression, or to beautify the facial feature.

SUMMARY

Embodiments of the present disclosure provide an image processing method, a computer readable storage medium and an electronic device.

The image processing method includes: operating a camera module to acquire a target image in response to a first processing unit receiving an image acquisition instruction; and performing predetermined processing on the target image.

The computer readable storage medium having a computer program stored thereon, in which when the computer program is executed by a processor, the computer program implements the image processing method as described above, in which the method includes: operating a camera module to acquire a target image in response to a first processing unit receiving an image acquisition instruction; and performing predetermined processing on the target image.

The electronic device includes: a first processing unit and a camera module, in which the first processing unit is connected to the camera module and is configured to operate the camera module to acquire a target image in response to receiving an image acquisition instruction; and the electronic device performs predetermined processing on the target image.

BRIEF DESCRIPTION OF DRAWINGS

In order to clearly illustrate technical solutions of embodiments of the present disclosure or in the prior art, a brief description of drawings used in embodiments or the prior art is given below. Obviously, the drawings in the following descriptions are only part embodiments of the present disclosure, and for those skilled in the art, other drawings can be obtained according to these drawings without creative labor.

FIG. 5 is a schematic diagram of calculating depth information according to an embodiment.

FIG. 6 is a flow chart of an image processing method according to yet another embodiment.

DETAILED DESCRIPTION

In order to make objects, technical solutions and advantages of the present disclosure more apparent, the present disclosure will be described in further detail below with reference to the accompanying drawings and embodiments. It should be understood that the specific embodiments described herein are merely used to explain the present disclosure and are not intended to limit the present disclosure.

It may be understood that the terms "first", "second," and the like as used herein may be used to describe various elements, but these elements are not limited by these terms. These terms are only used to distinguish one element from another. For example, a first processing unit may be referred to as a second processing unit, and similarly, the second processing unit may be referred to as the first processing unit, without departing from the scope of the present disclosure. Both the first processing unit and the second processing unit are processing units, but they are not the same processing unit.

Embodiment 1

Figures 1, 2:
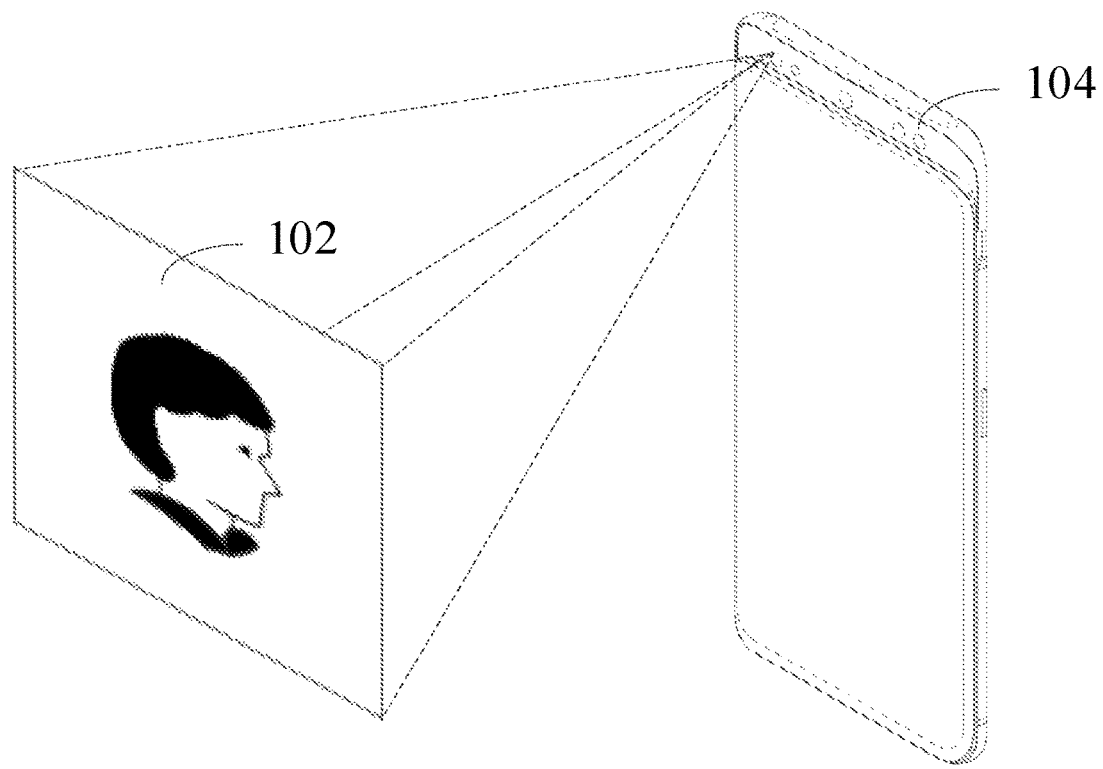
FIG. 1 is a diagram of an application scenario of an image processing method according to an embodiment.
FIG. 2 is a flow chart of an image processing method according to an embodiment.

FIG. 1 is a diagram of an application scenario of an image processing method according to an embodiment. As illustrated in FIG. 1, the application scenario includes a user 102 and an electronic device 104. The electronic device 104 may be provided with a camera module, may further include a first processing unit and a second processing unit, and may be provided with several applications. The first processing unit may operate the camera module to acquire a target image containing a face of the user 102 in response to receiving an image acquisition instruction initiated by an application. The camera module sends the target image to the second processing unit, which obtains a depth image through calculation according to the target image and sends the target image and the depth image to the first processing unit, in which the depth image is configured to represent depth information corresponding to the target image. The first processing unit performs face recognition processing according to the target image and the depth image. The electronic device 104 may be a smart phone, a tablet computer, a personal digital assistant, a wearable device, and so on. The data is processed through the first processing unit and the second processing unit, so that a speed on processing the data is improved.

FIG. 2 is a flow chart of an image processing method according to an embodiment. As illustrated in FIG. 2, the image processing method includes block 02 and block 04.

At block 02, a first processing unit operates a camera module to acquire a target image in response to receiving an image acquisition instruction.

At block 04, predetermined processing is performed on the target image.

Figure 3:
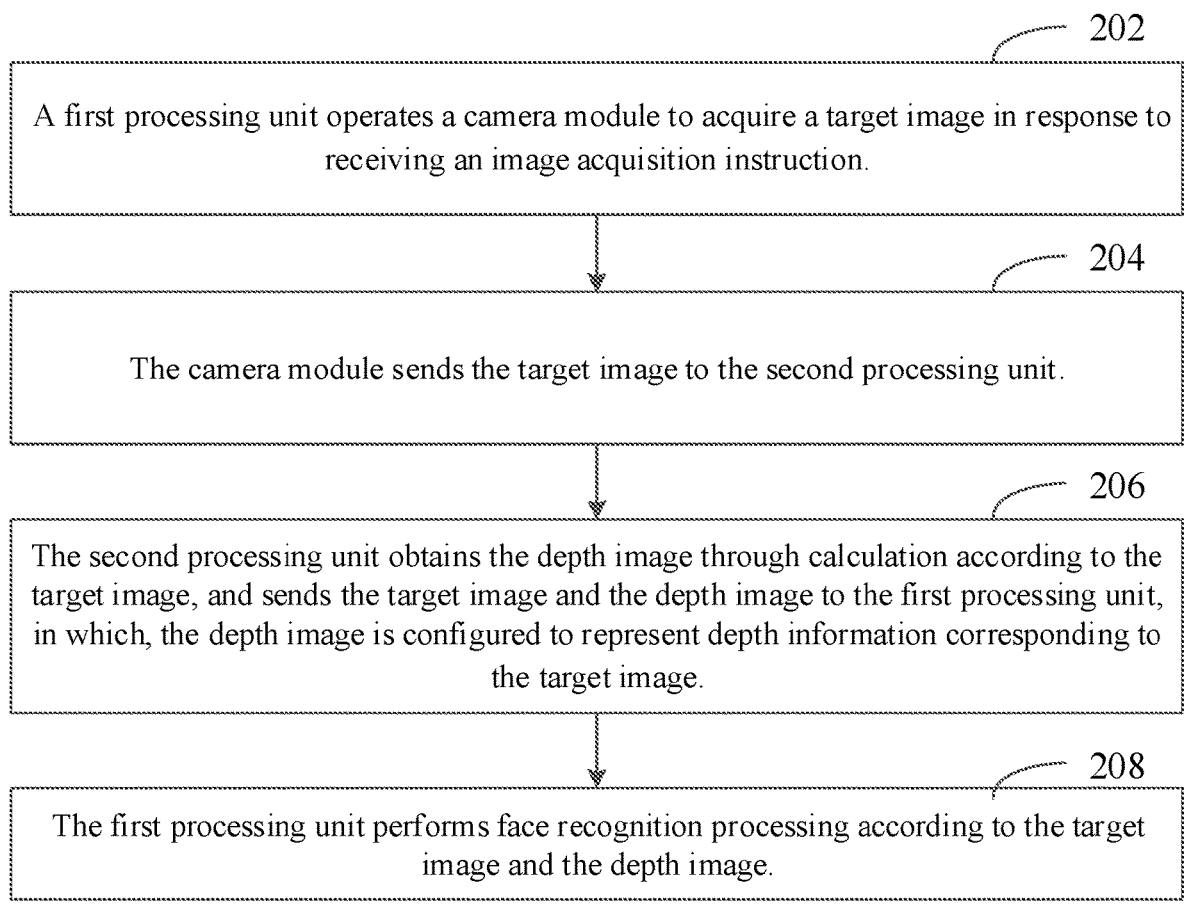
FIG. 3 is a flow chart of an image processing method according to an embodiment.

Specifically, as illustrated in FIG. 3, block 02 includes block 202, and block 04 includes block 204, block 206, and block 208. That is, the image processing method includes block 202, block 204, block 206, and block 208.

At block 202, a first processing unit operates a camera module to acquire a target image in response to receiving an image acquisition instruction.

In an embodiment, cameras may be mounted on the electronic device and images may be acquired by the mounted cameras. The cameras may be classified into a laser camera, a visible light camera and the like according to the difference of the acquired images. The laser camera may acquire an image formed by irradiating laser on an object, and a visible light image may acquire an image formed by irradiating visible light on the object. A plurality of cameras may be mounted on the electronic device, and installation positions are not limited. For example, one camera may be mounted on a front panel of the electronic device, two cameras may be mounted on a back panel of the electronic device, and the cameras may be mounted inside the electronic device in an embedded manner with the cameras being opened by rotating or sliding. Specifically, a front camera and a rear camera may be mounted on the electronic device, and may acquire images from different viewing angles. Normally, the front camera may acquire images from a front viewing angle of the electronic device, and the rear camera may acquire images from a rear viewing angle of the electronic device.

The processing unit may process the images acquired by the camera. The processing unit is connected with the camera. Images acquired by the camera may be transmitted to the processing unit and then processing such as cutting, brightness adjustment, face detection, face recognition and the like may be performed by the processing unit. In this embodiment, the electronic device includes the first processing unit and the second processing unit, where the first processing unit and the second processing unit are in different safe environments, and process the image in the safe environment, so as to ensure the safety of the image.

The image acquisition instruction is an instruction for triggering an image acquisition operation, and is specifically configured to acquire an image containing a face. For example, when the user unlocks the smart phone, the user may verify and unlock the smart phone by acquiring the face image; and when the user pays through the smart phone, the face image may be authenticated. The first processing unit may receive an instruction from an upper application. When the first processing unit receives the image acquisition instruction, the first processing unit may control the camera module to work, and an infrared image and a speckle image are acquired through the cameras. Specifically, the camera module may include, but is not limited to, a laser camera, a laser light, and a floodlight. And the acquired target image may include, but is not limited to, the infrared image and the speckle image. When the first processing unit receives the image acquisition instruction, the first processing unit may control the laser light and the floodlight to work in a time-sharing manner, so that when the laser light is turned on, the speckle image is acquired through the laser camera; and when the floodlight is turned on, the infrared image is acquired through the laser camera.

Specifically, when laser light is directed onto an optically rough surface having an average undulation greater than a magnitude of a wavelength, randomly distributed bins scattered wavelets on these surfaces are superimposed on each other, such that a reflected light field has a random spatial light intensity distribution and presents a grainy structure, which are laser speckle points. The formed laser speckle points have a high randomness, and thus the laser speckle points generated by the laser light emitted by different laser emitters are different. Speckle images generated are not identical when the formed laser speckle points are illuminated onto objects of different depths and shapes. The laser speckle points formed by different laser emitters are unique and thus the obtained speckle images are also unique. The laser speckle points formed by the laser light may be illuminated onto an object, and then the speckle image formed by the laser speckle points illuminated onto the object is acquired by the laser camera.

At block 204, the camera module sends the target image to the second processing unit.

The first processing unit and the second processing unit are processing units distributed on different processors and in different safe environments. Specifically, a central processing unit (CPU) in the electronic device has two operation modes: TEE (trust execution environment) and REE (rich execution environment). Normally, the CPU runs under the REE, but when the electronic device needs to acquire data with a higher safety level, for example, the electronic device needs to acquire face data for identification and verification, the CPU may switch from the REE to the TEE for operation. When the CPU in the electronic device is a single-core CPU, the single core may be directly switched from the REE to the TEE; and when the CPU in the electronic device is a multi-core CPU, the electronic device switches one core from the REE to the TEE, while the rest cores are still running in the REE. A first execution environment refers to the TEE.

In one embodiment, the first processing unit may be a processing unit in the CPU, for example, may be a core or multiple cores in the CPU, and the first safe environment may be the TEE. The second processing unit in the second safe environment may be a safe processing module in a DSP (digital signal processing). When the application sends the image acquisition instruction to the CPU, the electronic device switches one core in the CPU from the REE to the TEE, and the CPU core switched to the TEE controls the camera module to acquire the image according to the image acquisition instruction, so that the safety of the acquired image is ensured. After the camera module acquires the infrared image and the speckle image, the infrared image and the speckle image may be directly sent to a safety processing module in the DSP for processing.

At block 206, the second processing unit obtains the depth image through calculation according to the target image, and sends the target image and the depth image to the first processing unit, where the depth image is configured to represent depth information corresponding to the target image.

The laser light may emit a plurality of laser speckle points. When the laser speckle points irradiate objects at different distances, positions of the speckle points presented on the image are different. The electronic device may pre-acquire a standard reference image that is formed by the laser speckle irradiating on a plane. Consequently, the speckle points on the reference image are generally uniformly distributed, and then a corresponding relationship between each speckle point in the reference image and reference depth is established. When a speckle image needs to be acquired, the laser light is controlled to emit laser speckles, and after the laser speckles irradiate an object, the speckle image is acquired through the laser camera. And then each speckle point in the speckle image is compared with a speckle point in the reference image to acquire a position offset of the speckle point in the speckle image relative to a corresponding speckle point in the reference image. And the actual depth information corresponding to the speckle point is acquired according to the position offset of the speckle point and the reference depth.

The infrared image and the speckle image acquired by the camera correspond to each other. The speckle image may be used for calculating the depth information corresponding to each pixel point in the infrared image. In this manner, a face may be detected and identified through the infrared image, and the depth information corresponding to the face may be calculated according to the speckle image. Specifically, in the process of calculating the depth information according to the speckle image, first relative depth is calculated according to the position offset of the speckle image relative to the speckle point in the reference image, in which the relative depth may represent the depth information from an actually shot object to a reference plane. And then the actual depth information of the object is calculated according to the obtained relative depth and the reference depth. The depth image is configured to represent the depth information corresponding to the infrared image, and may be the relative depth from the object to the reference plane or an absolute depth from the object to the camera.

At block 208, the first processing unit performs face recognition processing according to the target image and the depth image.

In the embodiment provided in the present disclosure, the face recognition processing refers to performing recognition processing on a face included in an image. Specifically, face detection processing may be performed according to the infrared image, the area where the face is located in the infrared image is extracted, and the extracted face is identified to distinguish the identity of the face. The depth image corresponds to the infrared image, and depth information corresponding to the face may be obtained according to the depth image, so that whether the face belongs to a living body is identified. According to the face recognition processing, the identity of the face obtained currently may be authenticated.

According to the image processing method provided in the above embodiment, the first processing unit may operate the camera module to acquire a target image in response to receiving the image acquisition instruction, and send the target image to the second processing unit. The second processing unit obtains the depth image through calculation according to the speckle image and then sends the target image and the depth image to the first processing unit. The first processing unit performs the face recognition processing according to the depth image and the infrared image. In this manner, the target image may be processed by both the first processing unit and the second processing unit, and thus the data processing speed is improved.

Figure 4:
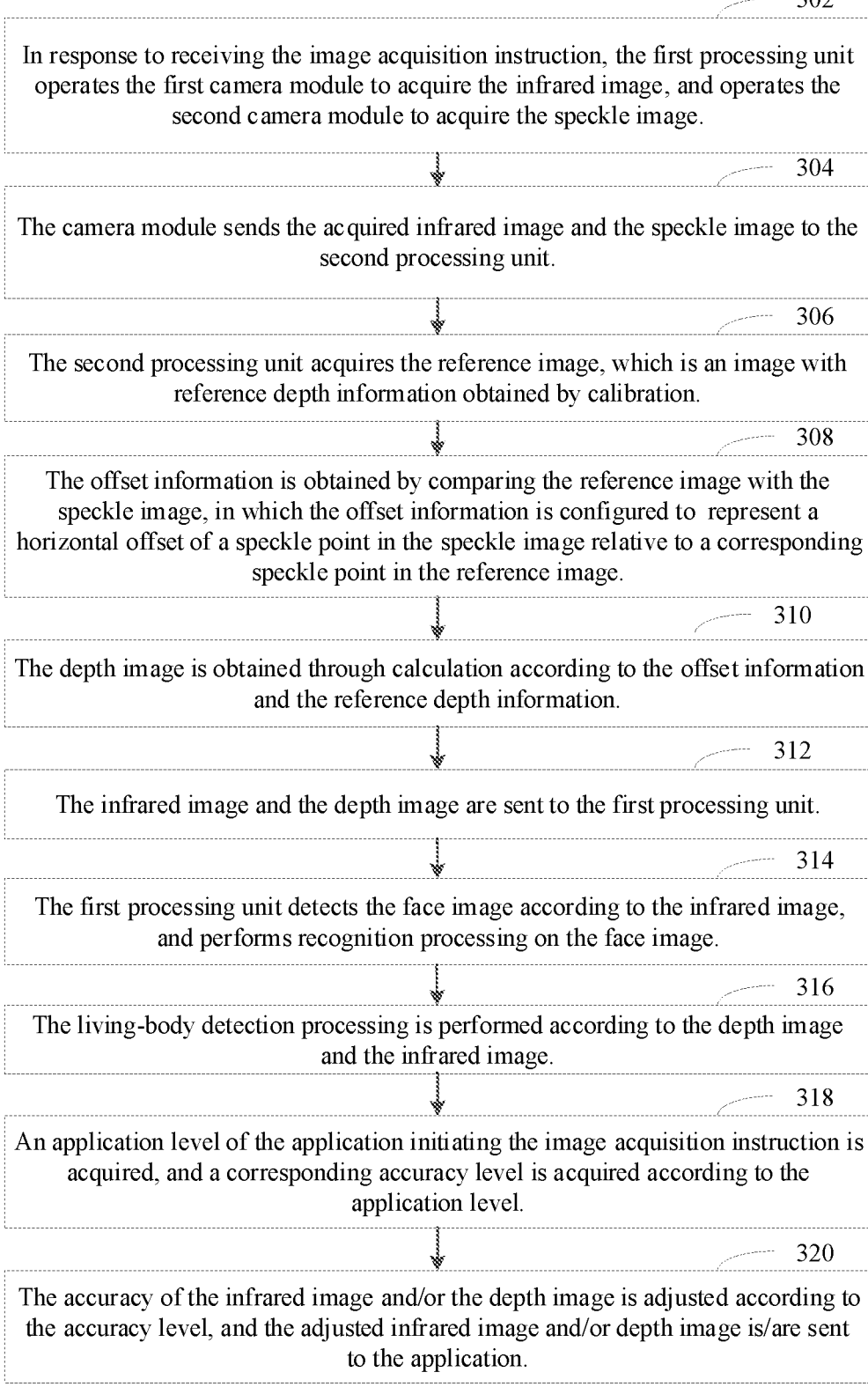
FIG. 4 is a flow chart of an image processing method according to another embodiment.

FIG. 4 is a flow chart of an image processing method according to another embodiment. As illustrated in FIG. 4, the image processing method includes blocks 302 to 320.

At block 302, the first processing unit operates the first camera module to acquire the infrared image in response to receiving the image acquisition instruction, and controls the second camera module to acquire the speckle image; in which a time interval between a first time point of acquiring the infrared image and a second time point of acquiring the speckle image is less than a first threshold.

In one embodiment, the first camera module is composed of the floodlight and the laser camera, and the second camera module is composed of the laser light and the laser camera. The laser camera in the first camera module and the laser camera in the second camera module may be the same laser camera or different laser cameras, which is not limited herein. When the first processing unit receives the image acquisition instruction, the first processing unit may control the first camera module and the second camera module to work. The first camera module and the second camera module may work in parallel or in the time-sharing manner, and the working sequence of them is not limited. For example, the first camera module may be controlled to acquire the infrared image first, or the second camera module may be controlled to acquire the speckle image first.

It may be understood that since the infrared image corresponds to the speckle image, the consistency between the infrared image and the speckle image must be ensured. Supposing that the first camera module and the second camera module work in the time-sharing manner, the time interval for acquiring the infrared image and the speckle image is required to be very short. The time interval between the first time point of acquiring the infrared image and the second time point of acquiring the speckle image is less than the first threshold. Generally, the first threshold is a relatively small value, and may be adjusted according to a change rule of the object to be shot. The faster the object to be shot changes, the smaller the first threshold obtained correspondingly is. The first threshold may be set to a larger value, assuming that the object to be shot is in a stationary state for a long time. Specifically, the change speed of the object to be shot is obtained, and the corresponding first threshold is obtained according to the change speed.

For example, when the mobile phone needs to be authenticated and unlocked with a face, the user may click an unlocking key to initiate an unlocking instruction, and put the front camera in front of his/her face for capturing. The mobile phone may send the unlocking instruction to the first processing unit, and then the first processing unit controls the camera to work. First, the first camera module acquires the infrared image, and then the second camera module is controlled to acquire the speckle image after an interval of 1 millisecond, and finally the authentication and unlocking may be performed according to the acquired infrared image and the speckle image.

At block 304, the camera module sends the acquired infrared image and the speckle image to the second processing unit.

At block 306, the second processing unit acquires the reference image, which is an image with reference depth information obtained by calibration.

The electronic device may calibrate the laser speckle points in advance to obtain the reference image, and store the reference image in the electronic device. In general, the reference image is formed by illuminating the laser speckle points onto the reference plane, and is an image with a plurality of speckle points. Each speckle point has corresponding reference depth information. When the depth information of the captured object needs to be acquired, the actually acquired speckle image may be compared with the reference image, and the actual depth information may be calculated according to offsets of the speckle points in the actually acquired speckle image.

FIG. 5 is a schematic diagram of calculating depth information according to an embodiment. As illustrated in FIG. 5, the laser light 402 may generate the laser speckle points. After the laser speckle points are reflected by an object, the formed image is acquired by the laser camera 404. During a calibration process of the camera, the laser speckle points emitted by the laser light 402 are reflected by a reference plane 408. And then reflected light is acquired by the laser camera 404, and imaged by an imaging plane 410 to obtain a reference image. The reference depth from the reference plane 408 to the laser light 402 is L, which is known. In a process of actually calculating the depth information, first the laser speckle points emitted by the laser light 402 are reflected by an object 406, then the reflected light is acquired by the laser camera 404, and finally an actual speckle image is obtained by imaging through the imaging plane 410. A formula for calculating the actual depth information is as follows.

$$Dis = \frac{CD \times L \times f}{L \times AB + CD \times f} \quad \text{Formula (1)}$$

where L is a distance between the laser light 402 and the reference plane 408, f is a focal length of a lens in the laser camera 404, CD is a distance between the laser light 402 and the laser camera 404, and AB is an offset distance between an image of the object 406 and an image of the reference plane 408. AB may be a product of a pixel offset n and an actual distance p of the pixel point. When a distance D is between the object 404 and the laser light 402 is greater than the distance L between the reference plane 406 and the laser light 402, AB is a negative value; and when the distance D is between the object 404 and the laser light 402 is less than the distance L between the reference plane 406 and the laser light 402, AB is a positive value.

At block 308, the offset information is obtained by comparing the reference image with the speckle image, in which the offset information is configured to represent a horizontal offset of a speckle point in the speckle image relative to a corresponding speckle point in the reference image.

Specifically, throughout each pixel point (x, y) in the speckle image, select a pixel block with a preset size by taking the pixel as a center. For example, a pixel block with a size of 31 pixel*31 pixel may be selected. And then a matched pixel block in the reference image is searched, and the horizontal offset between a coordinate of the matched pixel point in the reference image and a coordinate of the pixel point (x, y) is calculated, in which a rightward offset is positive, and a leftward offset is negative. After that, the calculated horizontal offset is substituted into the formula (1) to obtain the depth information of the pixel point (x, y). By analogy, the depth information of each pixel point in the speckle image is calculated in sequence, so that the depth information with depth information corresponding to each pixel point in the speckle image may be obtained.

At block 310, the depth image is obtained through calculation according to the offset information and the reference depth information.

The depth image may be configured to represent depth information corresponding to the infrared image, and each pixel point in the depth image represents one piece of depth information. Specifically, each speckle point in the reference image corresponds to one piece of reference depth information. After the horizontal offset between the speckle point in the speckle image and the speckle point in the reference image is obtained, relative depth information from the object in the speckle image to the reference plane may be obtained through calculation according to the horizontal offset, and then the actual depth information from the object to the camera may be obtained through calculation according to the relative depth information and the reference depth information, so that the final depth image is obtained.

At block 312, the infrared image and the depth image are sent to the first processing unit.

The first processing unit and the second processing unit may be connected through a secure buffer, so that the infrared image and the depth image obtained through calculation according to the second processing unit may be sent to the first processing unit through the secure buffer, thereby ensuring the safety of image processing.

At block 314, the first processing unit detects the face image according to the infrared image, and performs recognition processing on the face image.

After receiving the infrared image and the depth image, the first processing unit performs the face recognition processing according to the infrared image and the depth image. The process of face recognition includes a face authentication stage and a living-body detection stage, in which the face authentication stage refers to a process of recognizing the identity of a face, and the living-body detection stage refers to a process of recognizing whether the shot face belongs to a living body. In the face authentication stage, the first processing unit may perform the face detection on the infrared image to detect whether a face exists in the infrared image. When a face exists in the infrared image, the face image contained in the infrared image is extracted, and then the extracted face image is matched with the face image stored in the electronic device. When the matching is successful, the face authentication passes.

When matching the extracted face image with the face image stored in the electronic device, face attribute features of the face image may be extracted for a comparison with the face attribute features of the face image stored in the electronic device. When a matching value exceeds a matching threshold, the face authentication is considered to be successful. For example, features such as a deflection angle, brightness information, facial features and the like in the face image may be extracted as the face attribute features. When a matching degree between the extracted face attribute features and the stored face attribute features exceeds 90%, the face authentication is considered to be successful.

At block 316, the living-body detection processing is performed according to the depth image and the infrared image.

Generally, in the process of authenticating a face, whether the face image is matched with a preset face image may be authenticated according to the acquired infrared image. If a face in a photograph or of a sculpture is taken, authentication may also be successful. Therefore, the living-body detection processing needs to be performed according to the acquired depth image and the acquired infrared image, so that the authentication is successful only when the acquired face belongs to a living body. It can be understood that the acquired infrared image may represent detailed information of the face, and the acquired depth image may represent the depth information corresponding to the infrared image, so that the living-body detection processing may be performed according to the depth image and the infrared image. For example, when a photographed face is a face in a photograph, it may be determined from the depth image that the acquired face is not stereoscopic, and thus the acquired face may be considered as a face that does not belong to a living body.

Specifically, performing the living-body detection according to the above-described depth image includes: searching for face depth information corresponding to the face image in the depth image, in which when the face depth information corresponding to the face image exists in the depth image and the face depth information accords with rules of a stereoscopic face, the face image is a living-body face image. The rules of a stereoscopic face are rules with three-dimensional depth information of a face. Optionally, the first processing unit may further perform artificial intelligent recognition on the infrared image and the depth image by using an artificial intelligent model, obtain living-body attribute features corresponding to the face image, and determine whether the face image is the living-body face image according to the obtained living-body attribute features. The living body attribute features may include skin features, texture directions, texture densities, texture widths, and the like corresponding to the face image. When the living-body attribute features conform to rules of a face of a living body, the face image is considered to have biological activity, that is, the living-body face image. It will be understood that when the first processing unit performs processing such as face detection, face authentication, or living-body detection, the processing sequence may be changed as necessary. For example, the face may be authenticated first, and then whether the face belongs to a living body may be detected. Alternatively, it may be detected first whether the face belongs to a living body, and then the face may be authenticated.

The first processing unit performing the living-body detection according to the infrared image and the depth image may specifically include: acquiring continuous frames of infrared images and depth images; detecting whether the face has corresponding depth information according to the infrared images and the depth images; and when the face has the corresponding depth information, detecting whether the face is changed or not through the continuous frames of infrared images and depth images, such as whether the face blinks, swings, opens the mouth and so on. And when the corresponding depth information of the face is detected to exist and the face changes, it is determined that the face belongs to a living body. When the face recognition processing is performed, the first processing unit does not perform the living-body detection in response to an unsuccessful face authentication, or does not perform the face authentication in response to unsuccessful living-body detection.

At block 318, an application level of the application initiating the image acquisition instruction is acquired, and a corresponding accuracy level is acquired according to the application level.

In the embodiments provided by the present disclosure, the application may be installed in the electronic device, where the application refers to software written in the electronic device for a certain application purpose, and the electronic device may satisfy a user's demand through the application. For example, the user may play games through a game application, make a transaction payment through a payment application, play music through a music application, and the like. After identifying the face, the first processing unit may send the identification result to the application, and may also send the acquired infrared image and/or depth image to the application at the same time. When the infrared image and/or the depth image are sent, the infrared image and/or the depth image with different accuracy may be sent to different applications.

Specifically, the application level of the application initiating the image acquisition instruction may be acquired, and a corresponding accuracy level may be acquired according to the application level. The application level may represent a level of importance of the application. In general, the higher the application level of the application, the higher the accuracy of the sent image. The electronic device may preset the application level of the application, and establish a corresponding relationship between the application level and the accuracy level, and thus a corresponding accuracy level may be obtained according to the application level. For example, applications may be divided into four application levels, namely an application with a safe system, an application with an unsafe system, a third-party safe application and a third-party unsafe application, accuracy levels corresponding to which are gradually reduced.

At block 320, the accuracy of the infrared image and/or of the depth image is adjusted according to the accuracy level, and the adjusted infrared image and/or depth image is/are sent to the application.

The accuracy of the infrared image and/or of the depth image may be expressed as a resolution of the image, or the number of the speckle points included in the speckle image.

The accuracy of the depth image acquired according to the speckle image may also be different. Specifically, adjusting the image accuracy may include: adjusting the resolution of the infrared image and/or of the depth image according to the accuracy level; or, adjusting the number of the speckle points included in the acquired speckle image according to the accuracy level and acquiring the depth image according to the speckle image. The number of the speckle points included in the speckle image may be adjusted by software or hardware. When the adjustment is made by software, the speckle points in the acquired speckle image may be directly detected, and some of the speckle points are combined or eliminated, so that the number of the speckle points included in the adjusted speckle image is reduced. When the adjustment is made by hardware, the number of the laser speckle points generated by diffraction of the laser light may be adjusted. For example, when the accuracy is high, the number of generated laser speckle points is 30,000; and when the accuracy is low, the number of generated laser speckle points is 20,000. In this manner, the accuracy of the depth image calculated correspondingly is reduced correspondingly.

Specifically, different diffractive optical elements (DOEs) may be preset in the laser light, in which the number of speckle points formed by diffraction of different DOEs is different. Different DOEs are switched according to the accuracy level to generate the speckle image by diffraction, and depth images with different accuracy are obtained according to the acquired speckle image. When the application level of the application is high, the corresponding accuracy level is also high, so that the laser light may control the DOE with a great number of speckle points to emit the laser speckle points, thereby obtaining the speckle image with a great number of speckle points; and when the application level of the application is low, the corresponding accuracy level is also low, so that the laser light may control the DOE with a small number of speckle points to emit the laser speckle points, thereby obtaining the speckle image with a small number of speckle points.

In one embodiment, images acquired by the application may be used for different application operations. For example, facial beautification processing of a portrait in a RGB image may be performed through the acquired depth image, a 2D image may be converted into a 3D image through the acquired depth image, and the authentication processing such as payment and unlocking may be performed through the acquired image. After the image acquisition instruction is received, the safety level of the image acquisition instruction may be obtained. Application operations of different safety levels have different channels for sending images.

Specifically, the safety level of the image acquisition instruction is obtained, and a face recognition result is sent to the application through the data transmission channel corresponding to the safety level. The face recognition result may include the infrared image, the depth image, the face authentication result, the living-body detection result and the like. The data transmission channel includes a safe transmission channel and an unsafe transmission channel. The safe transmission channel has a high safety level, and the unsafe transmission channel has a low safety level. When the image is sent through the safe transmission channel, the image may be encrypted before sending. The image acquisition instruction with the high safety level corresponds to the safe transmission channel, and the image acquisition instruction with the low safety level corresponds to the unsafe transmission channel. For example, an image acquisition instruction initiated during payment may transmit an image via the safe transmission channel, and an image acquisition instruction initiated during shooting may transmit an image via the unsafe transmission channel.

Transmitting the image via the safe transmission channel may specifically include: encrypting the face recognition result, and sending the encrypted face recognition result to the application. It may be understood that the speckle image refers to an image formed by irradiating the laser speckles, which are acquired by the laser camera, on an object, and the laser speckles formed by different laser lights are unique. Therefore, the acquired speckle image or the reference image may be used as an encrypted key to encrypt the face identification result. For example, the speckle image may be directly superimposed with the infrared image to obtain an encrypted depth image. And a pixel matrix corresponding to the speckle image and a pixel matrix corresponding to the infrared image may also be subjected to product operation to obtain the encrypted depth image. Or, the pixel value corresponding to one or more pixel points in the reference image or the speckle image may also be used as an encryption key to encrypt the depth image or the infrared image, and the specific encryption algorithm is not limited in this embodiment.

As illustrated in FIG. 6, in an embodiment provided in the present disclosure, the block of acquiring the infrared image and the speckle image may further specifically include the followings.

At block 502, the first processing unit obtains a time stamp included in the image acquisition instruction.

Specifically, when the application sends the image acquisition instruction, the image acquisition instruction may include the time stamp, which is used for recording the time when the application generates the image acquisition instruction. The first processing unit may acquire the time stamp from the image acquisition instruction in response to receiving the image acquisition instruction, and determine the time of generating the image acquisition instruction according to the time stamp.

At block 504, the camera module is controlled to acquire the infrared image at the first time point, in which the time interval between the first time point and the time stamp is smaller than a second threshold.

The first processing unit may acquire a current time after acquiring the time stamp included in the image acquisition instruction. When the time interval between the current time and the timestamp is less than the second threshold, the camera module is controlled to acquire the infrared image; and when the time interval between the current time and the timestamp is greater than the second threshold, prompt information indicating a response timeout may be returned to the application, and the application is waited to reinitiate the image acquisition instruction.

At block 506, the camera module is controlled to acquire the speckle image at the second time point, in which the time interval between the second time point and the time stamp is less than a third threshold.

After the camera module acquires the infrared image, the first processing unit may control the camera module to acquire the speckle image. The time interval between the second time point when the speckle image is acquired and the first time point is less than the first threshold, and the time interval between the second time point and the time stamp is less than the third threshold. When the time interval between the second time point and the first time point is greater than the first threshold, or when the time interval between the second time point and the timestamp is greater than the third threshold, the prompt information indicating the response timeout is returned to the application, and the application is waited to reinitiate the image acquisition instruction. It is to be understood that the second time point of acquiring the speckle image may be greater than the first time point of acquiring the infrared image, or may be less than the first time point of acquiring the infrared image, which is not limited herein.

Specifically, the electronic device may be respectively provided with a floodlight controller and a laser light controller, and the first processing unit is respectively connected with the floodlight controller and the laser light controller through two PWMs. When the first processing unit needs to control the floodlight or the laser light to be turned on, a pulse wave may be transmitted to the floodlight controller through the PWM to control the floodlight to be turned on, or the pulse wave may be transmitted to the laser light controller through the PWM to control the laser light to be turned on. The time interval between acquisitions of the infrared image and the speckle image is controlled by transmitting the pulse wave to the two controllers through the PWMs. The time interval between the acquisitions of the infrared image and the speckle image is less than the first threshold, so that the consistency of the acquired infrared image and the speckle image may be ensured, a large error between the infrared image and the speckle image is avoided, and the accuracy of image processing is improved.

Figure 7:
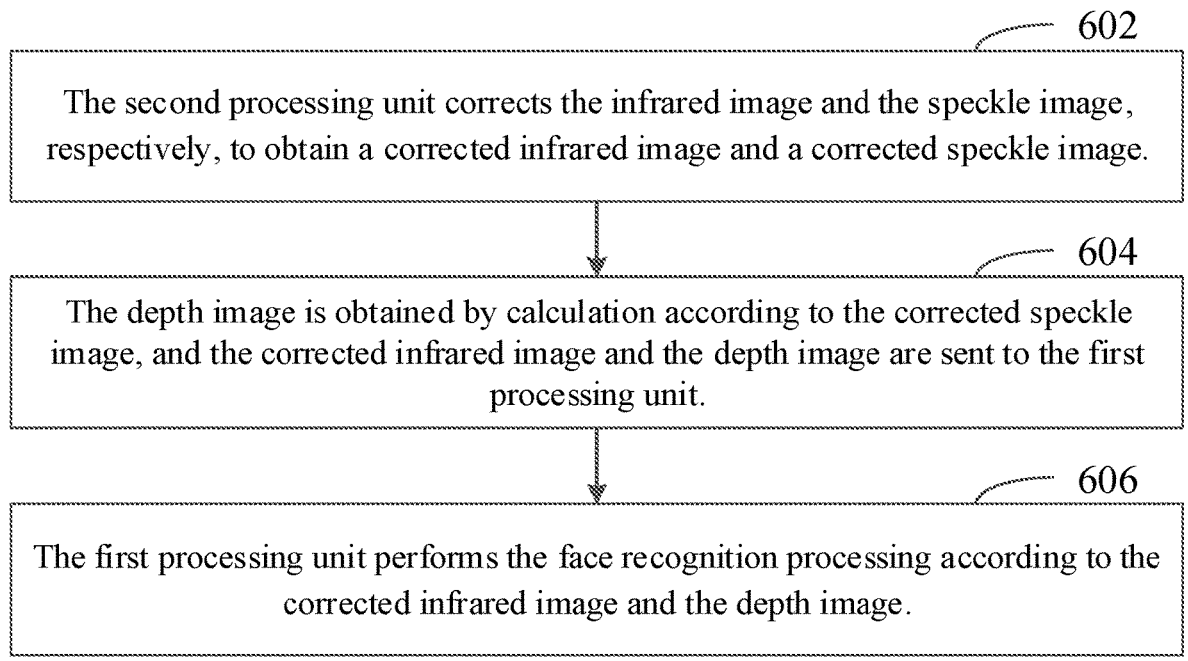
FIG. 7 is a flow chart of an image processing method according to still yet another embodiment.

As illustrated in FIG. 7, in an embodiment provided by the present disclosure, the camera module may generate an angular offset, so that the acquired infrared image and the speckle image generate an offset. In this manner, the infrared image and the speckle image acquired by the camera module may be corrected before the depth image is calculated. The block of correcting may specifically include the followings.

At block 602, the second processing unit corrects the infrared image and the speckle image, respectively, to obtain a corrected infrared image and a corrected speckle image.

The second processing unit corrects the infrared image and the speckle image, respectively, namely, corrects internal and external parameters in the infrared image and the speckle image. For example, when the laser camera generates a deflection, the acquired infrared image and speckle image need to correct errors generated by the deflection to obtain a standard infrared image and a standard speckle image. Correcting the infrared image may obtain the corrected infrared image, and correcting the speckle image may obtain the corrected speckle image. Specifically, an infrared parallax image may be obtained by calculation according to the infrared image, and then an internal and external parameter correction may be performed on the infrared image according to the infrared parallax image to obtain the corrected infrared image. A speckle parallax image may be obtained by calculation according to the speckle image, and then the internal and external parameter correction may be performed on the speckle image according to the speckle parallax image to obtain the corrected speckle image.

At block 604, the depth image is obtained by calculation according to the corrected speckle image, and the corrected infrared image and the depth image are sent to the first processing unit.

The infrared image and the speckle image obtained after correction are the infrared image and the speckle image obtained after the error is removed. The second processing unit may obtain the depth image through calculation according to the corrected speckle image, and then send the corrected infrared image and the depth image to the first processing unit. After that, the first processing unit performs the face recognition processing according to the corrected infrared image and the depth image.

At block 606, the first processing unit performs the face recognition processing according to the corrected infrared image and the depth image.

According to the image processing method provided in the above embodiments, the first processing unit may operate the camera module to acquire the infrared image and the speckle image in response to receiving the image acquisition instruction, and send the infrared image and the speckle image to the second processing unit. The second processing unit obtains the depth image through calculation according to the speckle image, and then sends the infrared image and the depth image to the first processing unit. The first processing unit performs the face recognition processing according to the depth image and the infrared image. In this manner, the first processing unit and the second processing unit jointly perform the processing on the image, and the speed on processing the image is increased.

It should be understood that although the blocks in the flow charts of FIGS. 3, 4, 6 and 7 are illustrated in sequence as indicated by arrows, the blocks are not necessarily performed in sequence as indicated by the arrows. The blocks are not strictly ordered to perform, and the blocks may be performed in other orders, unless explicitly stated herein. Moreover, at least a portion of the blocks in FIGS. 3, 4, 6, and 7 may include several sub-steps or stages. Instead of being performed at the same time necessarily, the sub-steps or stages may be performed at different times. And the sub-steps or stages may be performed alternately with other steps or at least a portion of the sub-steps or stages of other steps, rather than being necessarily performed sequentially.

Figure 8:
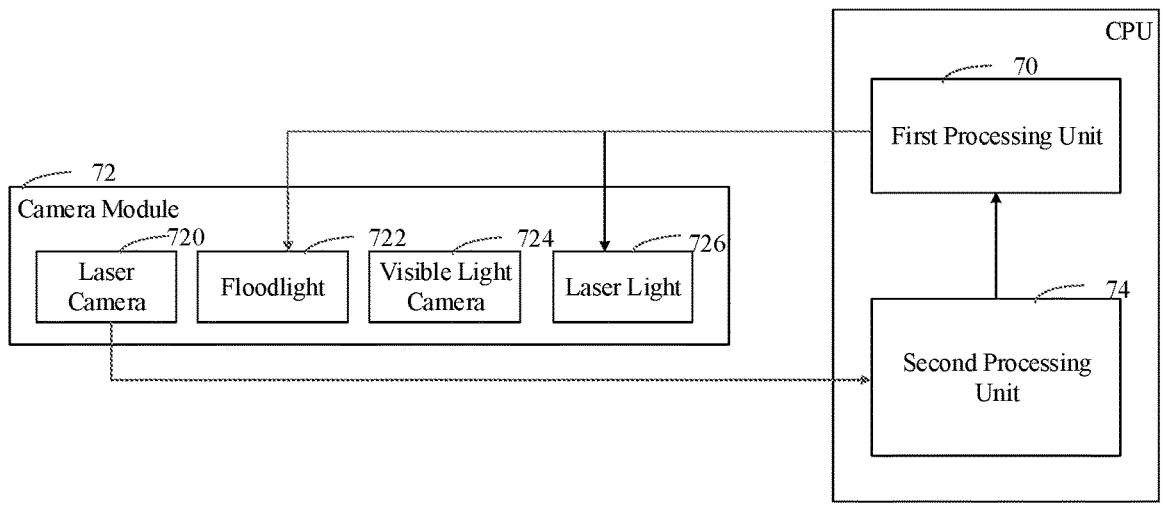
FIG. 8 is a structure diagram of hardware for implementing an image processing method according to an embodiment.

FIG. 8 is a structure diagram of hardware for implementing an image processing method according to an embodiment. As illustrated in FIG. 8, the hardware structure includes a first processing unit 70, a camera module 72, and a second processing unit 74. The camera module 72 includes a laser camera 720, a floodlight 722, a visible light camera 724, and a laser light 726. The CPU may include a processor core under the TEE and a processor core under the REE, where the TEE and the REE are operation modes of an ARM module (Advanced RISC Machines), and the first processing unit is the CPU core under the TEE. Generally, when the CPU handles an operation behavior with high safety, the CPU needs to switch the processor core under the TEE for an execution, and an operation behavior with low safety may be executed under the TEE. The second processing unit 74 is a DSP safe processing module allocated in a space of the CPU. In the embodiment of the present disclosure, when the first processing unit 70 receives the image acquisition instruction of the application, for example, when the application requires the face information for the unlocking and payment, the first processing unit 70 may transmit the pulse wave through the PWM module to control the floodlight 722 in the camera module 72 to be turned on to acquire the infrared image, and then control the laser light 726 in the camera module 72 to be turned on to acquire the speckle image. The camera module 72 may transmit the acquired speckle image to the second processing unit 74, and the second processing unit 74 may obtain the depth image through calculation according to the speckle image and transmit the obtained depth image to the first processing unit 70. The first processing unit 70 performs the face authentication according to the infrared image to detect whether a face exists in the infrared image, and whether the detected face matches with a stored face. When the face authentication is passed, the living-body detection is performed according to the infrared image and the depth image, and it is determined whether the face belongs to a living body. In one embodiment, after the infrared image and the depth image are acquired, the second processing unit 74 may perform the living-body detection before the face authentication, or may perform the face authentication before the living-body detection. After the first processing unit 70 performs the face authentication and the living-body detection, a processing result is sent to the application, and then the application performs application operations such as unlocking and payment according to the detection result.

Figure 9:
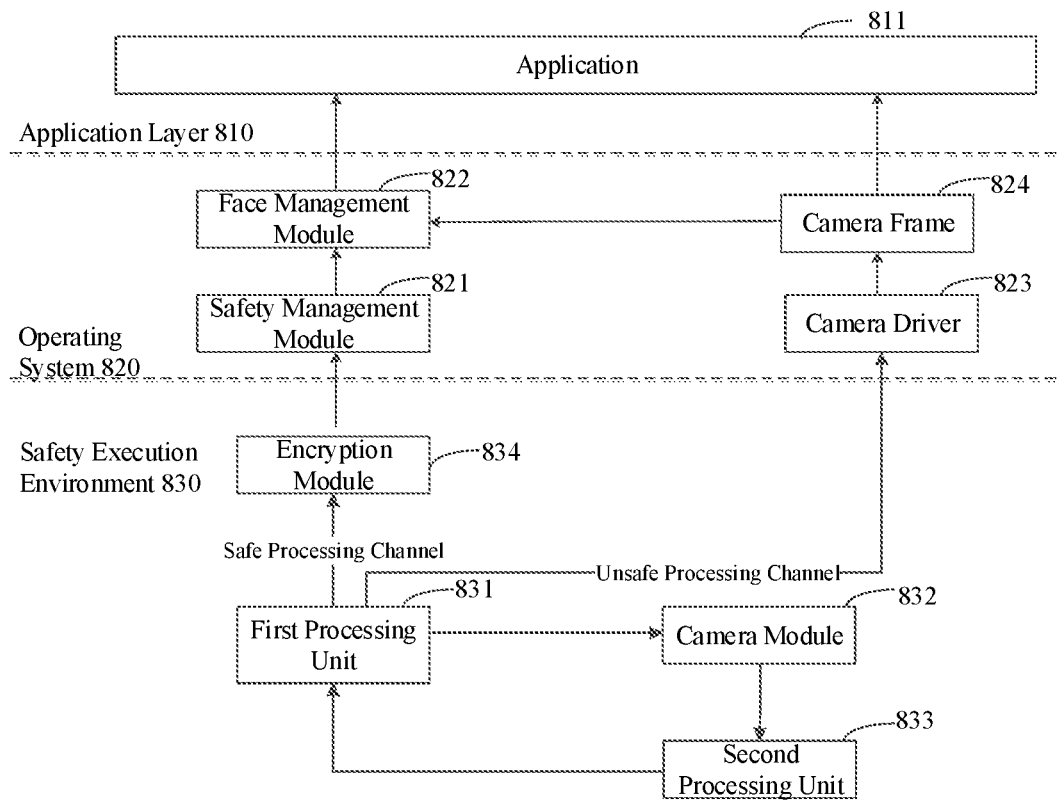
FIG. 9 is a schematic diagram of a software architecture for implementing an image processing method according to an embodiment.

FIG. 9 is a schematic diagram of a software architecture for implementing an image processing method according to an embodiment. As illustrated in FIG. 9, the software architecture includes an application layer 810, an operating system 820, and a safe execution environment 830. Modules in the safe execution environment 830 include a first processing unit 831, a camera module 832, a second processing unit 833, an encryption module 834, and so on. The operating system 820 includes a safety management module 821, a face management module 822, a camera driver 823 and a camera frame 824. The application layer 810 includes an application 811. The application 811 may initiate the image acquisition instruction and send the image acquisition instruction to the first processing unit 831 for processing. For example, when operations such as payment, unlocking, facial beautification and augmented reality (AR) are performed by obtaining a face, the application may initiate the image acquisition instruction for obtaining a face image. After receiving the image acquisition instruction, the first processing unit 831 controls the camera module 832 to acquire the infrared image and the speckle image according to the image acquisition instruction, and transmits the infrared image and the speckle image acquired by the camera module 832 to the second processing unit 833. The second processing unit 833 obtains the depth image including the depth information through calculation according to the speckle image, and then transmits the infrared image and the depth image to the first processing unit 831. The first processing unit 831 performs the face authentication according to the infrared image, detects whether a face exists in the infrared image, and detects whether the detected face is matched with a stored face. When the face authentication is passed, the living-body detection is performed according to the infrared image and the depth image, and it is determined whether the face belongs to a living body. The first processing unit 831 determines the safety level corresponding to the image acquisition instruction. When the acquired image is used for safe application operations such as payment and unlocking, the acquired infrared image, depth image, and detection result are transmitted to the application 811 through the safe transmission channel. Specifically, the first processing unit 831 may send the infrared image, the depth image and the detection result to the encryption module 535. The encryption module 834 may encrypt the infrared image, the depth image and the detection result, and then send the infrared image, the depth image, and the detection result to the safety management module 821. Generally, different applications 811 have corresponding safety management modules 821. The safety management modules 821 will decrypt the encrypted infrared image, depth image and detection result, and send the infrared image, depth image and detection result obtained after decryption to corresponding face management modules 822. The face management module 822 sends the infrared image, the depth image, and the detection result to the application 811 at an upper layer, and the application 811 performs corresponding operations according to the infrared image, the depth image, and the detection result. When the acquired depth image is used for unsafe application operations such as facial beautification, AR, etc., the first processing unit 831 may send the infrared image and the depth image directly to the camera driver 823 through the unsafe transmission channel. After that, the camera driver 823 may send the infrared image and the depth image to the camera frame 824, and then the camera frame 824 may send the infrared image and the depth image to the face management module 822 or the application 811. The switching between the safe transmission channel and the unsafe transmission channel is performed by the first processing unit 831.

Figure 10:
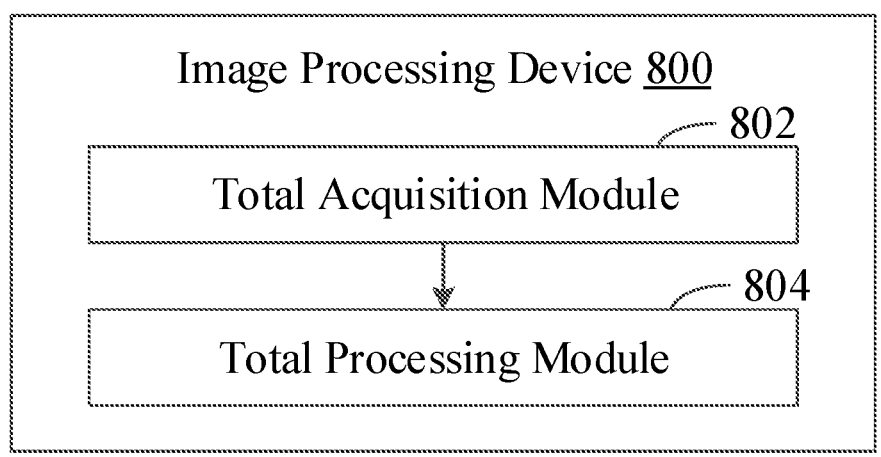
FIG. 10 is a structure diagram of an image processing device according to an embodiment.

FIG. 10 is a structure diagram of an image processing device according to an embodiment. As illustrated in FIG. 10, the image processing device 800 includes a total acquisition module 802 and a total processing module 804. The total acquisition module 802 is configured to control the camera module to acquire the target image according to the image acquisition instruction in response to the first processing unit receiving the image acquisition instruction. The total processing module 804 is configured to perform the predetermined processing on the target image.

Figure 11:
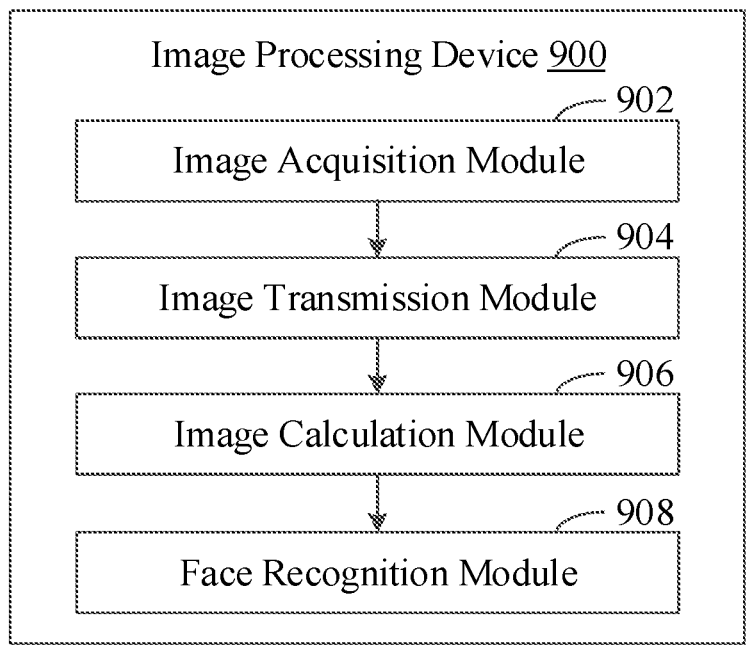
FIG. 11 is a structure diagram of an image processing device according to an embodiment.

Specifically, as illustrated in FIG. 11, the total acquisition module 802 includes an image acquisition module 902, and the total processing module 804 includes an image transmission module 904, an image calculation module 906 and a face recognition module 908. That is, the image processing device 900 includes the image acquisition module 902, the image transmission module 904, the image calculation module 906, and the face recognition module 908.

The image acquisition module 902 is configured to control the first processing unit to operate the camera module to acquire the target image according to the image acquisition instruction when the first processing unit receives the image acquisition instruction.

The image transmission module 904 is configured to send the target image to the second processing unit through the camera module.

The image calculation module 906 is configured to obtain, by the second processing unit, the depth image through calculation according to the target image and to send, by the second processing unit, the target image and the depth image to the first processing unit, where the depth image is configured to represent the depth information corresponding to the target image.

The face recognition module 908 is configured to perform, by the first processing unit, the face recognition processing according to the target image and the depth image.

According to the image processing device provided in the above embodiment, the first processing unit may operate the camera module to acquire the target image in response to receiving the image acquisition instruction and send the target image to the second processing unit. The second processing unit obtains the depth image through calculation according to the target image and then sends the target image and the depth image to the first processing unit. The first processing unit may perform the face recognition processing according to the target image and the infrared image. Therefore, the first processing unit and the second processing unit jointly process the target image, thereby improving the speed on processing data.

Figure 12:
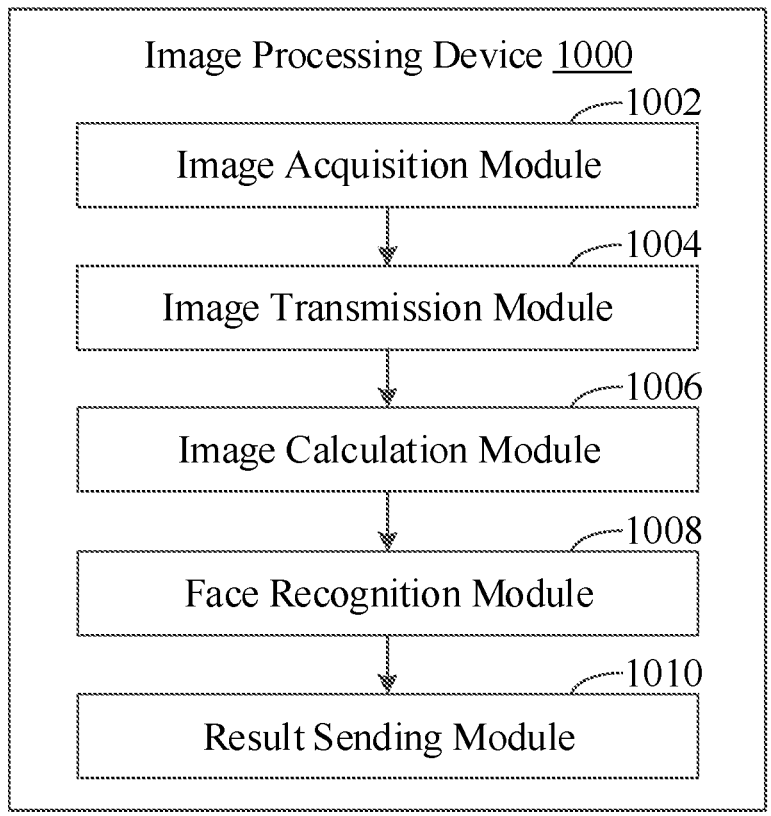
FIG. 12 is a structure diagram of an image processing device according to another embodiment.

FIG. 12 is a structure diagram of an image processing device according to another embodiment. As illustrated in FIG. 12, the image processing device 1000 includes an image acquisition module 1002, an image transmission module 1004, an image calculation module 1006, a face recognition module 1008 and a result sending module 1010.

The image acquisition module 1002 is configured to control, by the first processing unit, the camera module to acquire the infrared image and the speckle image according to the image acquisition instruction in response to the first processing unit receiving the image acquisition instruction.

The image transmission module 1004 is configured to send the acquired infrared image and the speckle image to the second processing unit through the camera module.

The image calculation module 1006 is configured to obtain, by the second processing unit, the depth image through calculation according to the speckle image, and to send, by the second processing unit, the infrared image and the depth image to the first processing unit, where the depth image is configured to represent the depth information corresponding to the infrared image.

The face recognition module 1008 is configured to perform, by the first processing unit, the face recognition processing according to the infrared image and the depth image.

The result sending module 1010 is configured to obtain the safety level of the image acquisition instruction, and to send the face recognition result to the application through the data transmission channel corresponding to the safety level.

According to the image processing device provided in the above embodiment, the first processing unit may operate the camera module to acquire the infrared image and the speckle image in response to receiving the image acquisition instruction, and may send the infrared image and the speckle image to the second processing unit. The second processing unit obtains the depth image through calculation according to the speckle image, and then sends the infrared image and the depth image to the first processing unit. The first processing unit performs the face recognition processing according to the depth image and the infrared image. Therefore, the first processing unit and the second processing unit jointly process the image, thereby increasing the speed on processing the data.

In an embodiment, the image acquisition module 1002 is further configured to control, by the first processing unit, the first camera module to acquire the infrared image and the second camera module to acquire the speckle image according to the image acquisition instruction. The time interval between the first time point of acquiring the infrared image and the second time point of acquiring the speckle image is less than the first threshold.

In an embodiment, the image acquisition module 1002 is further configured to obtain, by the first processing unit, the time stamp included in the image acquisition instruction; to control the camera module to acquire the infrared image at the first time point, in which the time interval between the first time point and the time stamp is less than the second threshold; and to control the camera module to acquire the speckle image at the second time point, in which the time interval between the second time point and the time stamp is less than the third threshold.

In an embodiment, the image calculation module 1006 is further configured to acquire the reference image through the second processing unit, in which the reference image is an image with the reference depth information obtained by calibration; to obtain the offset information by comparing the reference image with the speckle image, in which the offset information is configured to represent the horizontal offset of a speckle point in the speckle image relative to a corresponding speckle point in the reference image; and to obtain the depth image through calculation according to the offset information and the reference depth information.

In an embodiment, the image calculation module 1006 is further configured to correct, by the second processing unit, the infrared image and the speckle image, respectively, to obtain the corrected infrared image and the corrected speckle image; and to obtain the depth image through calculation according to the corrected speckle image, and to send, by the second processing unit, the corrected infrared image and the depth image to the first processing unit.

In an embodiment, the face recognition module 1008 is further configured to perform, by the first processing unit, the face recognition processing according to the corrected infrared image and the depth image.

In an embodiment, the face recognition module 1008 is further configured to detect a face image from the infrared image through the first processing unit, and to perform the recognition processing on the face image; and to perform the living-body detection processing according to the depth image and the infrared image.

In an embodiment, the result sending module 1010 is further configured to obtain the application level of the application that initiates the image acquisition instruction, and to obtain the corresponding accuracy level according to the application level; and to adjust the accuracy of the infrared image and/or of the depth image according to the accuracy level, and to send the adjusted infrared image and/or depth image to the application.

In an embodiment, the result sending module 1010 is further configured to adjust the resolution of the infrared image and/or of the depth image according to the accuracy level; or, to adjust the number of speckle points contained in the acquired speckle image according to the accuracy level, and to acquire the depth image according to the speckle image.

An embodiment of the present disclosure further provides an electronic device. An internal structure of the electronic device is illustrated in FIG. 8. The electronic device includes a first processing unit 70, a camera module 72 and a second processing unit 74. The first processing unit 70 is connected with the camera module 72 and the second processing unit 74, respectively, and the camera module 72 is connected with the second processing unit 74. The first processing unit 70 is configured to control the camera module 72 to acquire the target image according to the image acquisition instruction when the image acquisition instruction is received. The electronic device is configured to perform the predetermined processing on the target image, and performing the predetermined processing on the target image specifically includes the followings.

The first processing unit 70 receives the target image and the depth image sent by the second processing unit 74, and performs the face recognition processing according to the target image and the depth image.

The camera module 72 sends the acquired target image and speckle image to the second processing unit 74.

The second processing unit 74 obtains the depth image through calculation according to the target image, and sends the target image and the depth image to the first processing unit 70, in which the depth image is configured to represent the depth information corresponding to the target image.

In an embodiment, the first processing unit 70 is further configured to control the first camera module to acquire the infrared image according to the image acquisition instruction, and to control the second camera module to acquire the speckle image; in which the time interval between the first time point when the infrared image is acquired and the second time point when the speckle image is acquired is less than the first threshold.

In an embodiment, the first processing unit 70 is further configured to acquire the time stamp included in the image acquisition instruction; to control the camera module 72 to acquire the infrared image at the first time point, the time interval between the first time point and the time stamp being less than the second threshold; and to control the camera module 72 to acquire the speckle image at the second time point, the time interval between the second time point and the time stamp being less than the third threshold.

In an embodiment, the second processing unit 74 is further configured to acquire the reference image, which is an image with reference depth information obtained by calibration. The reference image is compared with the speckle image to obtain offset information, which is configured to represent the horizontal offset of a speckle point in the speckle image relative to a corresponding speckle point in the reference image. The depth image is obtained through calculation according to the offset information and the reference depth information.

In an embodiment, the second processing unit 74 is further configured to correct the infrared image and the speckle image respectively to obtain the corrected infrared image and the corrected speckle image; and to obtain the depth image through calculation according to the corrected speckle image, and to send the corrected infrared image and the depth image to the first processing unit 70. The first processing unit 70 is further configured to perform the face recognition processing according to the corrected infrared image and the depth image.

In an embodiment, the first processing unit 70 is further configured to detect the face image according to the infrared image, and to perform the recognition processing on the face image; and to perform the living-body detection processing according to the depth image and the infrared image.

In an embodiment, the first processing unit 70 is further configured to obtain the application level of the application initiating the image acquisition instruction, and to obtain the corresponding accuracy level according to the application level; and to adjust the accuracy of the infrared image and/or of the depth image according to the accuracy level, and to send the adjusted infrared image and/or depth image to the application.

In an embodiment, the first processing unit 70 is further configured to adjust the resolution of the infrared image and/or of the depth image according to the accuracy level; or to adjust the number of speckle points included in the acquired speckle image according to the accuracy level, and to obtain the depth image according to the speckle image.

In an embodiment, the first processing unit 70 is further configured to obtain the safety level of the image acquisition instruction, and to send the face recognition result to the application via the data transmission channel corresponding to the safety level.

Embodiment 2

Figure 13:
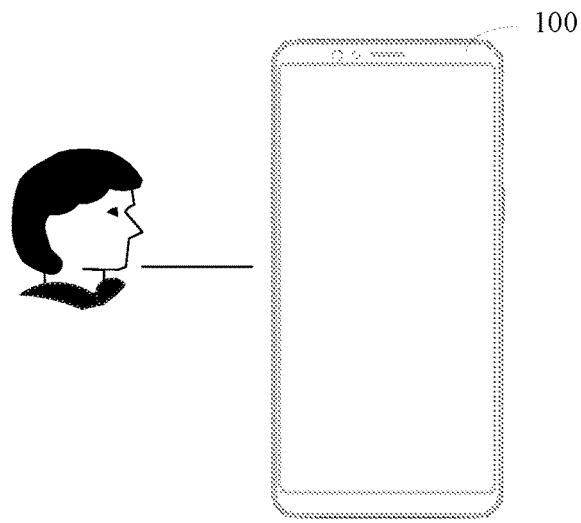
FIG. 13 is a diagram of an application environment for an image processing method according to an embodiment.

FIG. 13 is a diagram of an application scenario for an image processing method according to an embodiment. As illustrated in FIG. 13, the application environment includes an electronic device 100. The electronic device 100 may receive the image acquisition instruction in a trusted execution environment, acquire an infrared image of a user's face and a target speckle image emitted by structured light through the camera module, and process the infrared image and the target speckle image through the first processing unit and the safety processing unit to obtain the infrared image and the depth image. The electronic device 100 may be a smartphone, a tablet computer, a personal digital assistant, a wearable device, or the like. The processing speed is improved by processing through both the first processing unit and the safety processing unit. In addition, the safety of data is ensured as the data processing process is in a safety environment.

Figure 14:
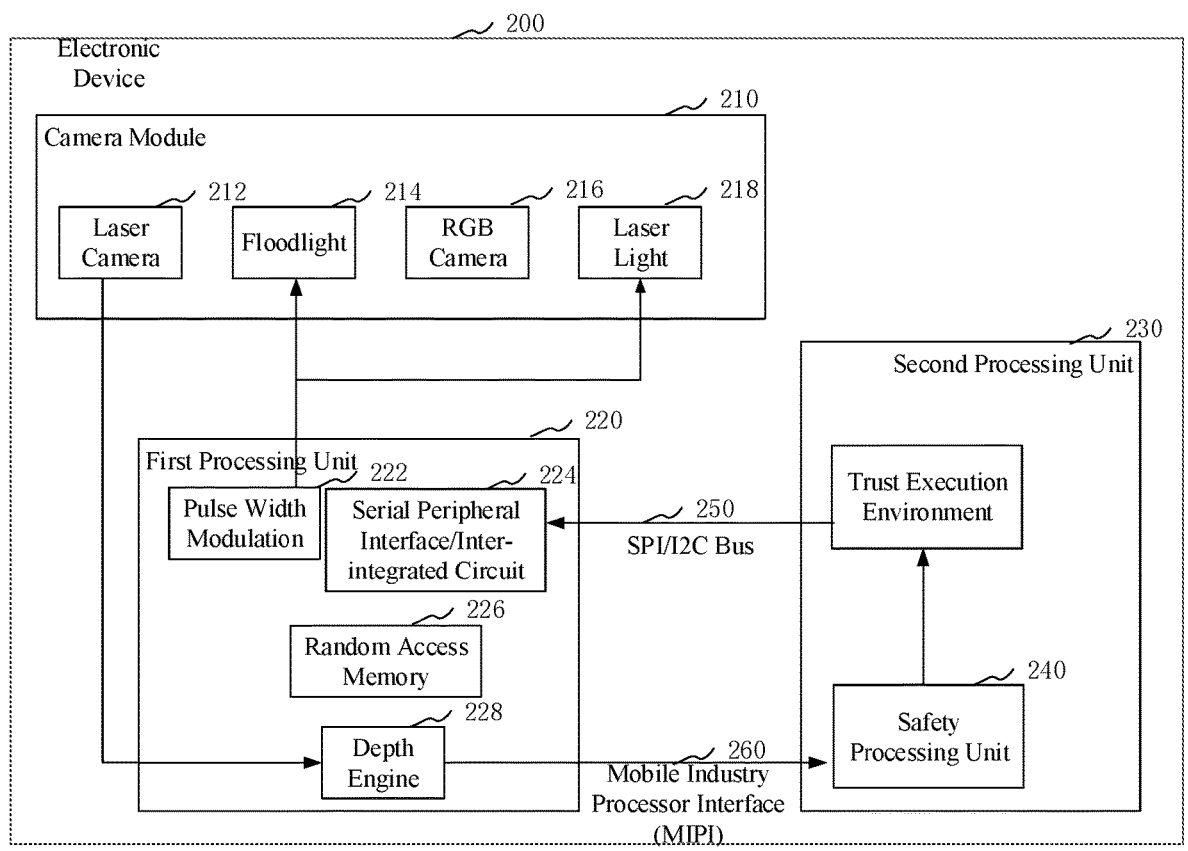
FIG. 14 is a schematic diagram of an internal structure of an electronic device according to an embodiment.

FIG. 14 is a schematic diagram of an internal structure of an electronic device according to an embodiment. As illustrated in FIG. 14, the electronic device 200 may include a camera module 210, a first processing unit 220, a second processing unit 230, a safety processing unit 240, and so on. The first processing unit 220 is connected to the camera module 210, the second processing unit 230 and the safety processing unit 240, respectively.

The camera module 210 may include a first image acquisition unit, a first projector, a second image acquisition unit, and a second projector. The first image acquisition unit, the first projector and the second projector are respectively connected to the first processing unit 220. The second image acquisition unit may be connected to the first processing unit 220 or the second processor 230. The first image acquisition unit may be a laser camera 212. The first projector may be a floodlight 214. The second image acquisition unit may be a RGB (Red/Green/Blue, Red/Green/Blue) camera 216. The second projector may be a laser light 218. Both the laser camera 212 and the RGB camera 216 may include elements such as a lens and an image sensor. Generally, the image sensor is a complementary metal oxide semiconductor (CMOS) or a charge coupled device (CCD). A surface of the image sensor in the laser camera 212 is provided with optical filters corresponding to respective pixels one by one to extract intensities of light with different wavelengths, so that the laser camera 212 may acquire invisible light images with different wavelengths. The filter allows a passage of light having a wavelength that is consistent with the wavelength of the light emitted by the laser light 218, such as infrared light, ultraviolet light, etc. The RGB camera 216 may acquire light intensity information of three channels (R/G/B) respectively using a Bayer filter, and acquire a color image of a target object. The floodlight 214 may be a laser diode, LED, or the like. The floodlight 214 emits light at the same wavelength as the laser light 218. The second projector may include a light source, a lens, and a structured-light-pattern generator. The light source may be a surface emitting laser, a vertical cavity surface emitting laser (VCSEL) array; and the structured-light-pattern generator may be ground glass, a diffractive optical element (DOE), or a combination thereof.

The first processing unit 220 may be a MCU (microcontroller unit). The MCU may include a PWM (pulse width modulation) 222, a SPI/I2C (serial peripheral interface/inter-integrated circuit) 224, a RAM (random access memory) 226, and a depth engine 228. The MCU may control the floodlight 214 to synchronize with the laser camera 212 through the PWM. The floodlight 214 emits floodlight to irradiate the target object, and a floodlight image is acquired through the laser camera 212. When the floodlight 214 emits the infrared light, the infrared image is acquired. The MCU controls the laser light 218 to synchronize with the laser camera 212 through the PWM. The laser light 218 projects a structured-light pattern to the target object, and the structured-light pattern is acquired by the laser camera 212 to obtain the target speckle image.

In an embodiment, the laser light 218 projects the structured-light pattern (a pattern with speckle particles) onto the reference plane at a known distance from the electronic device in advance. The structured-light pattern is acquired by the laser camera 212 as the reference speckle image and stored in a memory in the first processing unit 220, in a memory in the second processing unit 230, or in a memory in the safety processing unit 240. The memory is a non-volatile memory.

The second processing unit 230 may be a CPU processor. The second processing unit 230 includes a CPU core that runs under the TEE (trusted execution environment) and a CPU core that runs under the REE (rich execution environment). Both the TEE and REE are operation modes of the ARM module (Advanced RISC Machines). Generally, operation behaviors with high safety in the electronic device need to be executed under the TEE, and other operation behaviors may be executed under the REE. In the embodiment of the present disclosure, when the second processing unit 230 receives a face information obtaining request from an application, for example, when the application needs to perform the unlocking or payment with the face information, the CPU core running under the TEE may send the image acquisition instruction to the SPI/I2C interface 224 in the first processing unit 220 through a SECURE SPI/I2C bus 250, and may send a pulse wave through the PWM 222 to control the floodlight 214 in the camera module 210 to be turned on to acquire the infrared image and to control the laser light 218 in the camera module 210 to be turned on to collect the target speckle image. The camera module 210 may transmit the acquired infrared image and depth image to the Depth Engine 238 in the first processing unit 220 for processing. The Depth Engine 238 may calculate the acquired target speckle image and the reference speckle image to obtain a parallax image with offset information of corresponding points in the target speckle image and the reference speckle image, and to process the parallax image to obtain the depth image. The first processing unit 220 may obtain the depth image by sending the parallax image to the safety processing unit 240 through a mobile industry processor interface (MIPI) for processing.

The first processing unit 220 performs the face recognition according to the acquired infrared image, and detects whether a face exists in the infrared image and whether the detected face is matched with a stored face. When the face identification is passed, the living-body detection is performed according to the infrared image and the depth image to detect whether the face has biological activity. In an embodiment, after acquiring the infrared image and the depth image, the first processing unit 220 may perform the living-body detection before the face recognition, or perform the face recognition and the living-body detection simultaneously. When the face recognition is passed and the detected face has biological activity, the first processing unit 220 may send intermediate information of the infrared image and the depth image to the safety processing unit 240. The safety processing unit 240 obtains the depth information of the face by calculating the intermediate information of the infrared image and the depth image, and sends the depth information to the CPU core under the TEE.

The safety processing unit 240 may be a stand-alone processor, or may be a safety area formed in the second processing unit 230 by isolating hardware and software. For example, the second processing unit 230 may be a multi-core processor, and one of the cores is defined as a safety processing unit for calculating the depth information of the face, calculating a matching between the acquired infrared image and the stored infrared image, calculating a matching between the acquired depth image and the stored depth image, and the like. The safety processing unit 240 may perform parallel processing or serial processing on the data.

FIG. 2 is a flow chart of an image processing method according to an embodiment. As illustrated in FIG. 2, an image processing method, which may be executed on the electronic device as illustrated in FIG. 13 or FIG. 14, includes blocks 02 and 04.

At block 02, a first processing unit operates a camera module to acquire a target image in response to receiving an image acquisition instruction.

At block 04, the predetermined processing is performed on the target image.

Figure 15:
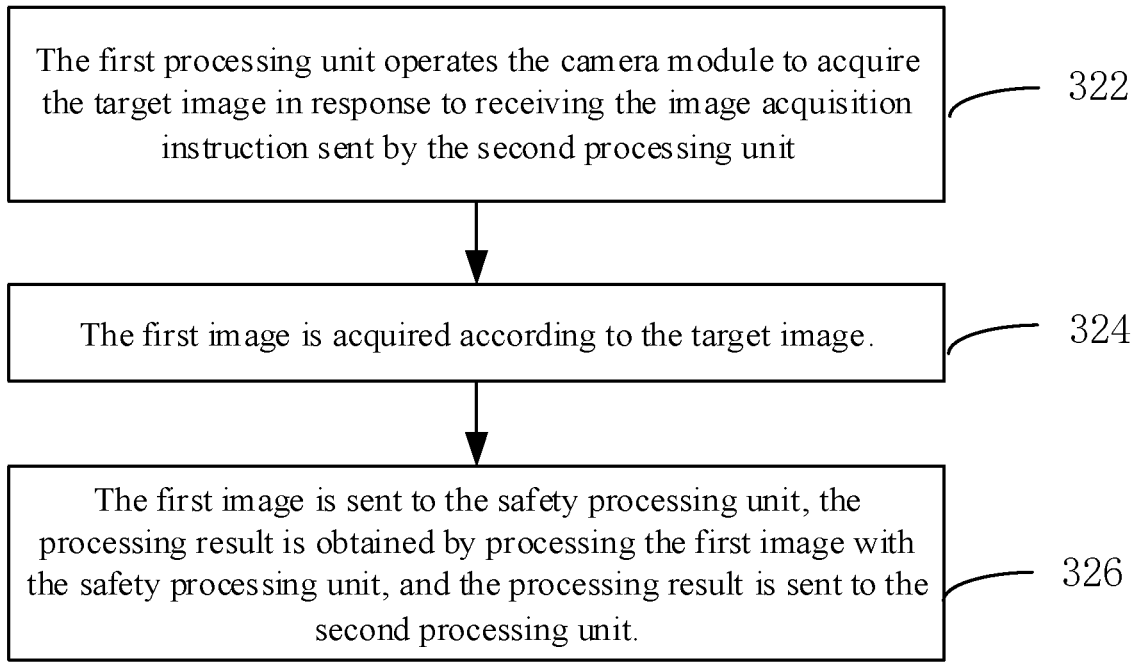
FIG. 15 is a flow chart of an image processing method according to an embodiment.

Specifically, as illustrated in FIG. 15, block 02 includes block 322, and block 04 includes block 324 and block 326. That is, the image processing method includes block 322, block 324, and block 326.

At block 322, the first processing unit operates the camera module to acquire the target image in response to receiving the image acquisition instruction sent by the second processing unit.

Specifically, the first processing unit 220 is a processor for processing data, which may be an MCU processor, for example. By controlling an input and output of the first processing unit 220, the first processing unit 220 may be configured to process data safely. The second processing unit 230 is a processor configured to process data, and may be, for example, a CPU processor.

The CPU in the electronic device has two operation modes: the TEE and the REE, in which the TEE refers to the trust execution environment, and the REE refers to the rich execution environment. Normally, the CPU runs under the REE. However, when the electronic device needs to obtain data with a high safety level, for example, when the electronic device needs to obtain face data, the CPU may be switched from the REE to the TEE. When the CPU in the electronic device is a single-core CPU, the single core may be directly switched from the REE to the TEE; and when the CPU in the electronic device is multi-core CPU, the electronic device switches one core from the REE to the TEE, and the rest cores still run in the REE. The target image refers to an image acquired by the camera on the target object, and may include at least one of the infrared image and the target speckle image.

When the second processing unit 230 receives information that face data is needed from the application, one core in the CPU is switched from the REE to the TEE, and the CPU core switched to the TEE sends the image acquisition instruction to the first processing unit, so that an instruction input by the first processing unit is ensured to be safe. The first processing unit 220 may operate the floodlight 214 in the camera module 210 to be turned on to acquire the infrared image and operate the laser light 218 in the camera module 210 to be turned on to acquire the depth image in response to receiving the image acquisition instruction. The floodlight 214 is a point light source that irradiates uniformly in all directions. The light emitted by the floodlight may be infrared light, and the electronic device may acquire a face to obtain the infrared image. The laser emitted by the laser light 218 may be diffracted by the lens and the DOE to generate a pattern with speckle particles, and may be projected onto the target object through the pattern with speckle particles. Due to differences of distances between respective points in the target object and the electronic device, an offset of the speckle image is generated. The laser camera 212 captures the target object to obtain the target speckle image.

The laser camera 212 transmits the captured target speckle image to the first processing unit 220.

At block 324, the first image is acquired according to the target image.

Specifically, the target image may include at least one of the infrared image and the target speckle image. The first processing unit processes the acquired infrared image to obtain an infrared intermediate image, processes the acquired target speckle image to obtain the parallax image containing offset information of corresponding points in the target speckle image and the reference speckle image or to obtain the depth image with depth information, and the like. The first image may include one or more of the infrared intermediate image, the parallax image, the depth image and the like.

At block 326, the first image is sent to the safety processing unit, the processing result is obtained by processing the first image with the safety processing unit, and the processing result is sent to the second processing unit.

Specifically, after the first processing unit 220 sends the first image to the safety processing unit 240, the safety processing unit 240 processes the first image to obtain a corresponding processing result, for example, processes the parallax image to obtain the depth image, and sends the infrared image and the depth image to the second processing unit 230 for storage. The second processing unit 230 may be in the trust execution environment or an untrusted execution environment, and may ensure the safety of data when storing the data in the trusted execution environment.

According to the image processing method in this embodiment, the first processing unit 220 controls the camera module to acquire the target image by receiving the image acquisition instruction sent by the second processing unit 230, obtains the first image according to the target image and sends the first image to the safety processing unit for processing. Data processing may be performed on the acquired target image by both the first processing unit and the safety processing unit, so that the data processing speed is increased.

In an embodiment, the image processing method further includes: operating, by the first processing unit, the camera module to acquire the target image in response to receiving the image acquisition instruction sent by the second processing unit in the trusted execution environment. In this manner, the acquisition instruction and the data processing process are performed in a safe environment, thereby ensuring the safety of the data.

In an embodiment, the target image includes the target speckle image, and acquiring the first image according to the target image includes: acquiring the reference speckle image, in which the reference speckle image is provided with the reference depth information; matching the reference speckle image with the target speckle image to obtain a matching result; and obtaining the first image according to the matching result, in which the first image is the parallax image with the offset information of corresponding points in the target speckle image and the reference speckle image.

Specifically, the depth information is a depth value. For each point in the target speckle image, a pixel block with a preset size, for example, a size of 31 pixel*31 pixel, is selected by taking the point (x, y) as a center. A matched block on the reference speckle image is searched to calculate a transverse offset between coordinates of a matched point on the reference speckle image and coordinates of the point (x, y). A rightward offset is positive, and a leftward offset is negative. The calculated offset is substituted into the formula (1) to obtain a depth value of the point (x, y), and a depth image with the depth information of respective points in the target speckle image may be obtained by calculating the depth value of each point in sequence. The first processing unit may also calculate the transverse offset of each point to obtain a parallax image with the offset between the corresponding points in the target speckle image and the reference speckle image.

In an embodiment, the target image includes the target speckle image, and acquiring the first image according to the target image includes: acquiring the reference speckle image, in which the reference speckle image is provided with the reference depth information; matching the reference speckle image with the target speckle image to obtain the matching result; and obtaining the first image according to the reference depth information and the matching result, in which the first image is a depth image with the depth information.

Specifically, the first processing unit 220 or the safety processing unit 240 calculates the offset between the target speckle image and the reference speckle image. On the basis of the offset, a depth value $Z_D$ of a distance between a space point corresponding to each pixel in the target speckle image and a first collector in the electronic device may be calculated. The calculation formula is as follows.

$$Z_D = \frac{L \times f \times Z_0}{L \times f + Z_0 \times P} \quad \text{Formula (1)}$$

where L refers to a distance between the first acquisition unit and the second projector, f is a focal length of a lens in the first image acquisition unit, $Z_D$ is a depth value of a distance between the reference plane and the first acquisition unit in the electronic device when the reference speckle image is acquired, and P is an offset between corresponding points in the target speckle image and the reference speckle image. P may be obtained by multiplying an offset pixel quantity between corresponding points in the target speckle image and the reference speckle image by an actual distance of a pixel point. When a distance between the target object and the first acquisition unit is greater than the distance between the reference plane and the first acquisition unit, P is a negative value; and when the distance between the target object and the first acquisition unit is less than the distance between the reference plane and the first acquisition unit, P is a positive value.

The first processing unit 220 calculates the target speckle image and the reference speckle image to obtain the parallax image with the offset information. The safety processing unit 240 obtains the depth image through calculation according to the parallax image with the offset information. The parallax image is an intermediate image.

Specifically, for each point in the target speckle image, a pixel block with the preset size, for example, the size of 31 pixel*31 pixel, is selected by taking the point (x, y) as a center. A matched block on the reference speckle image is searched to calculate the transverse offset between coordinates of a matched point on the reference speckle image and coordinates of the point (x, y). The rightward offset is positive, and the leftward offset is negative. The calculated offset is substituted into the formula (1) to obtain the depth value of the point (x, y), and the depth image with the depth information of respective points in the target speckle image may be obtained by calculating the depth value of each point in sequence.

In an embodiment, the target image includes the infrared image, and the image processing method further includes: performing the face recognition according to the infrared image; when the first image is the parallax image, acquiring a corresponding depth image according to the first image through the safety processing unit, and performing the living-body detection according to the infrared image and the depth image; and when the first image is the depth image, performing the living-body detection through the safety processing unit according to the infrared image and the first image.

After the camera module 210 acquires the infrared image and the target speckle image, the target speckle image and the infrared image may be transmitted to the first processing unit 220. The first processing unit 220 may perform the face detection on the infrared image and the depth image after receiving the infrared image and the depth image. The first processing unit 220 performing the face detection according to the infrared image includes that: the first processing unit 220 performs the face recognition on the infrared image to detect whether a face exists in the infrared image and matches the existing face with a face stored in the electronic device when a face exists. When the matching is successful, the face recognition is passed, that is, the detected face is consistent with the stored face. The first processing unit 220 may also perform the living-body detection according to the infrared image and the depth image. The first processing unit 220 performing the living-body detection according to the infrared image and the depth image includes that: the first processing unit 220 detects whether a face exists according to the infrared image, and the first processing unit 220 detects whether the existing face has depth information according to the depth image. When a face exists in the infrared image and the face in the infrared image has the depth information in the depth image, it may be determined that the face has the biological activity. Further, the first processing unit 220 may further perform intelligent recognition on the infrared image and the depth image by using an artificial intelligence model to obtain a texture of a detected face, and determine whether the face has biological activity according to the texture of the face. The sequence of the first processing unit 220 in performing the face recognition on the infrared image and performing the living-body detection on the infrared image and the depth image may be altered, that is, the first processing unit 220 may perform the face recognition before the living-body detection, or the first processing unit 220 may perform the living-body detection before the face recognition. In addition, the safety processing unit 240 may perform the face recognition and the living-body detection, or the first processing unit 220 may perform the face recognition and the safety processing unit 240 may perform the living-body detection, or the first processing unit 220 may perform the living-body detection and the safety processing unit 240 may perform the face recognition, which is not limited thereto.

The first processing unit 220 or the safety processing unit 240 performing the living-body detection according to the infrared image and the depth image includes: acquiring continuous frames of infrared images and depth images; detecting whether the face has corresponding depth information according to the infrared images and the depth images; and when the face has the corresponding depth information, detecting whether the face is changed or not through the continuous frames of infrared images and depth images, such as whether the face blinks, swings, opens the mouth and so on. And when the corresponding depth information of the face is detected to exist and the face changes, the face has the biological activity, and the face detection is passed. When the face detection is performed, the first processing unit 220 does not perform the living-body detection when the face recognition fails, or does not perform the face recognition when the living-body detection fails.

According to the method in the embodiment of the present disclosure, performing the face recognition and the living-body detection on the infrared image and the depth image may determine whether the detected face is a real person, thereby improving the accuracy of the face detection.

In an embodiment, the first processing unit 220 may also directly process the infrared image and the target speckle image to obtain the depth information of the face, and then send the acquired infrared image, target speckle image, and depth information of the face to the safety processing unit 240.

In an embodiment, controlling the camera module 210 to acquire the infrared image and the depth image includes that: the time interval between the acquisition of the infrared image and the depth image by the camera module is less than the first threshold.

The electronic device acquiring the infrared image and the depth image includes that: the electronic device turns on the floodlight 214 and acquires the infrared image through the laser camera 212; and the electronic device turns on the laser light 218 and acquires the depth image through the laser camera 212. When the electronic device acquires the infrared image and the depth image, in order to ensure the accuracy of the acquired data, the smaller the time interval between the acquisition of the infrared image and the acquisition of the depth image, the better.

The method for acquiring the infrared image and the depth image by the camera module includes the followings.

(1) The floodlight controller and the laser light controller are arranged respectively. The first processing unit is connected to the floodlight controller and the laser light controller respectively through two PWMs. When the first processing unit needs to control the floodlight or the laser light to be turned on, the pulse wave may be sent to the floodlight controller through a PWM to control the floodlight to be turned on or the pulse wave may be sent to the laser light controller through a PWM to control the laser light to be turned on. The time interval between the acquired infrared image and the depth image may be controlled through sending the pulse waves to the two controllers respectively through the PWMs.

(2) A controller is arranged for controlling the floodlight and the laser light. The first processing unit is connected to the controller through a PWM. When the first processing unit needs to control the floodlight or the laser light to be turned on, the first processing unit transmits pulse waves to the controller through the PWM to turn on the floodlight or the laser light, and the second processing unit 230 controls switching between the floodlight and the laser light. The time interval between the acquisition of the infrared image and the depth image being less than the first threshold is implemented by controlling the time interval of the switching between the floodlight and the laser light. The first threshold may be a value set by a user or a value set by the electronic device, which may be, for example, 1 millisecond.

According to the method in the embodiment of the present disclosure, the time interval between the acquired infrared image and the depth image is smaller than the first threshold, so that the consistency of the acquired infrared image and the depth image may be ensured, a large error between the infrared image and the depth image is avoided, and the accuracy of data processing is improved.

Figure 16:
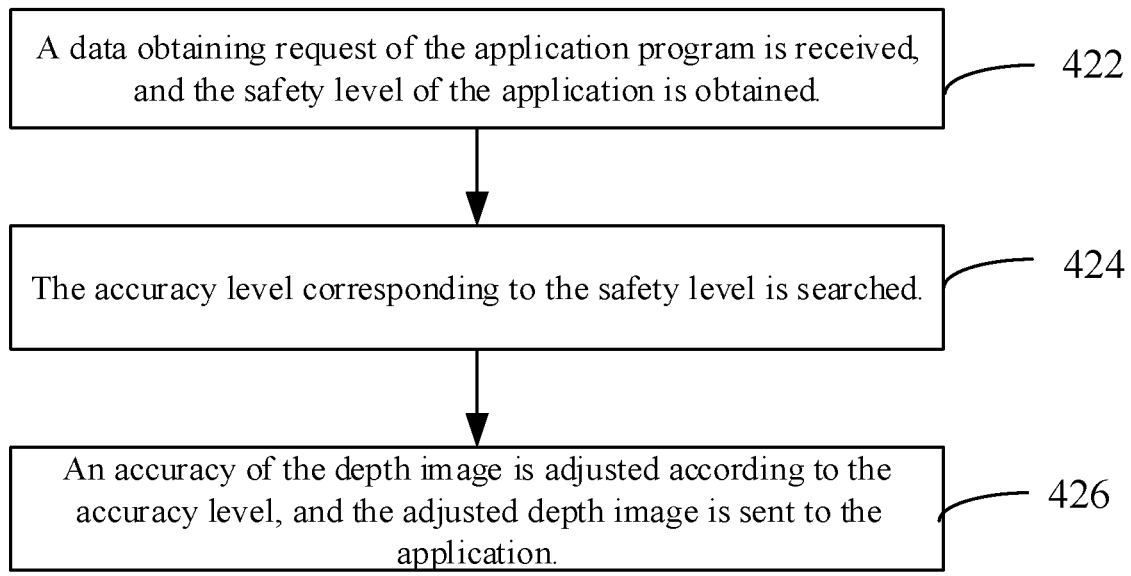
FIG. 16 is a flow chart of an image processing method according to another embodiment.

In an embodiment, as illustrated in FIG. 16, the image processing method further includes the followings.

At block 422, a data obtaining request of the application is received, and the safety level of the application is obtained.

Specifically, the second processing unit receives the data obtaining request initiated by the application and obtains the safety level of the application. The application is a program installed on the electronic device to provide a certain service. The safety level of the application may be preset on the electronic device. For example, safety levels of applications for unlocking, payment and the like are high. Applications that are not authorized for authentication, such as third-party applications that process images, have low levels of safety.

At block 424, the accuracy level corresponding to the safety level is searched.

Specifically, different safety levels are set in advance to correspond to accuracy levels of different images. The corresponding accuracy level is searched according to the safety level of the application.

At block 426, an accuracy of the depth image is adjusted according to the accuracy level, and the adjusted depth image is sent to the application.

Specifically, after obtaining the safety level corresponding to the application, the second processing unit may adjust the accuracy of the depth image according to the safety level of the application. The accuracy of the depth image is in direct proportion to the safety level of the application, namely the higher the safety level of the application is, the higher the accuracy of the depth image is; and the lower the safety level of the application is, the lower the accuracy of the depth image is. The second processing unit adjusts the accuracy of the depth image first, and then sends the adjusted depth image to the application.

The safety level of the application may be preset by the system, and the safety levels of different applications may be respectively set in a white list mode. For example, a first application that is authorized to provide the facial beautification may be provided with a high safety level, and a second application that is unauthorized to provide the facial beautification may be provided with a low safety level.

According to the embodiment of the present disclosure, providing the depth images with different accuracy levels according to the safety levels of the application may effectively control depth image data, ensure the security of the depth image data, and prevent the depth image data and the like from being obtained by an illegal application.

In an embodiment, adjusting the accuracy of the depth image according to the accuracy level includes at least one of the following methods.

(1) The resolution of the depth image is adjusted according to the accuracy level.

(2) The number of the points in the target speckle image acquired by the camera module is adjusted according to the accuracy level.

When the second processing unit 230 adjusts the accuracy of the depth image, the resolution of the depth image may be adjusted. When the accuracy of the depth image is high, the resolution of the depth image is high; and when the accuracy of the depth image is low, the resolution of the depth image is low. Adjusting the resolution of the image may be implemented by adjusting the number of pixels in the image. The second processing unit 230 may also adjust the accuracy of the depth image by reducing the number of points in the target speckle image acquired by the camera module. When the target speckle image has a large number of points, the accuracy of the depth image is high; and when the target speckle image has a small number of points, the accuracy of the depth image is low.

According to the method in the embodiment of the present disclosure, the accuracy of the depth image is adjusted according to the safety level of the application, so that the applications with different safety levels may acquire the depth images with different accuracy, a risk of data leakage caused by applications with low safety levels is reduced, and the safety of the data is improved.

Figure 17:
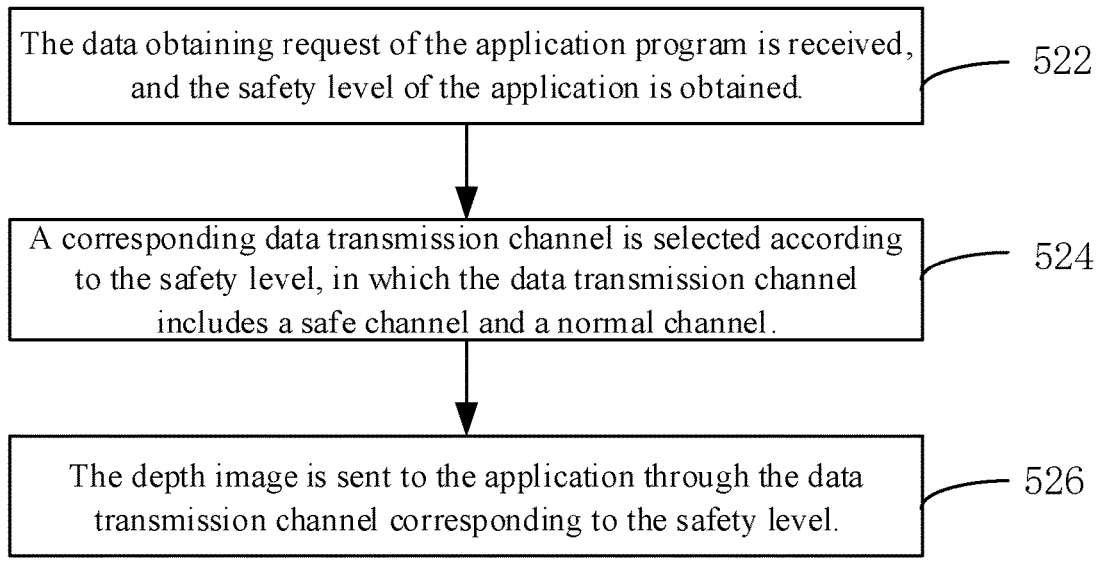
FIG. 17 is a flow chart of an image processing method according to another embodiment.

In an embodiment, as illustrated in FIG. 17, the image processing method further includes the followings.

At block 522, the data obtaining request of the application is received, and the safety level of the application is obtained.

At block 524, a corresponding data transmission channel is selected according to the safety level, in which the data transmission channel includes a safe channel and a normal channel.

At block 526, the depth image is sent to the application through the data transmission channel corresponding to the safety level.

The second processing unit 230 may identify the safety level of the application after receiving the data obtaining request of the application. When the data is transmitted to the application by the second processing unit 230, the safe channel and the normal channel may be set. The safe channel has a high safety level and the normal channel has a low safety level. When the data is transmitted in the safe channel, the data may be encrypted. And in the electronic device, corresponding data transmission channels may be arranged for applications with different safety levels. The application with a high safety level corresponds to the safe channel, and the application with a low safety level corresponds to the normal channel. For example, the safe channel may be used for data transmission of applications for payment, and the normal channel may be used for data transmission of applications for images. After obtaining the data transmission channel corresponding to the safety level of the application, the second processing unit 230 sends the depth image to the application through the corresponding data transmission channel, so that the application processes the depth image.

In an embodiment, the image processing method further includes: operating, by the first processing unit, the camera module to acquire the infrared image and the target speckle image in response to receiving the image acquisition instruction sent by the second processing unit in the first execution environment according to a verification request of the application; acquiring the depth image according to the target speckle image and sending the acquired infrared image and the acquired depth image to the safety processing unit, in which the safety processing unit compares the acquired infrared image with the stored infrared image and compares the acquired depth image with the stored depth image to obtain a verification result, and the verification result is sent to the second processing unit in the first execution environment; and sending the verification result to a server corresponding to the application through a data safety transmission channel.

Specifically, the authentication request of the application may be a request for the face authentication. The application may be an application requiring the verification result, such as an application for the unlocking, payment and the like. The verification result refers to successful verification or failed verification. The successful verification means that the infrared image passes the face verification, and the depth image passes the living-body detection. The failed verification means that the infrared image or the depth image fails the verification. The first execution environment may be the trusted execution environment.

The second processing unit 230 encrypts the verification result with a key predetermined by the application to obtain an encrypted file, and sends the encrypted file to the server corresponding to the application through the data safety transmission channel. For example, the application Alipay sends the encrypted file to a server corresponding to the Alipay.

According to the embodiment of the present disclosure, the infrared image and the target speckle image are acquired according to the verification request of the application, the face identification verification is performed according to the infrared image, the living-body detection is performed according to the depth image, and the verification result is sent to the application, such that the server corresponding to the application determines whether to execute an operation to pass the verification according to the verification result.

Figure 18:
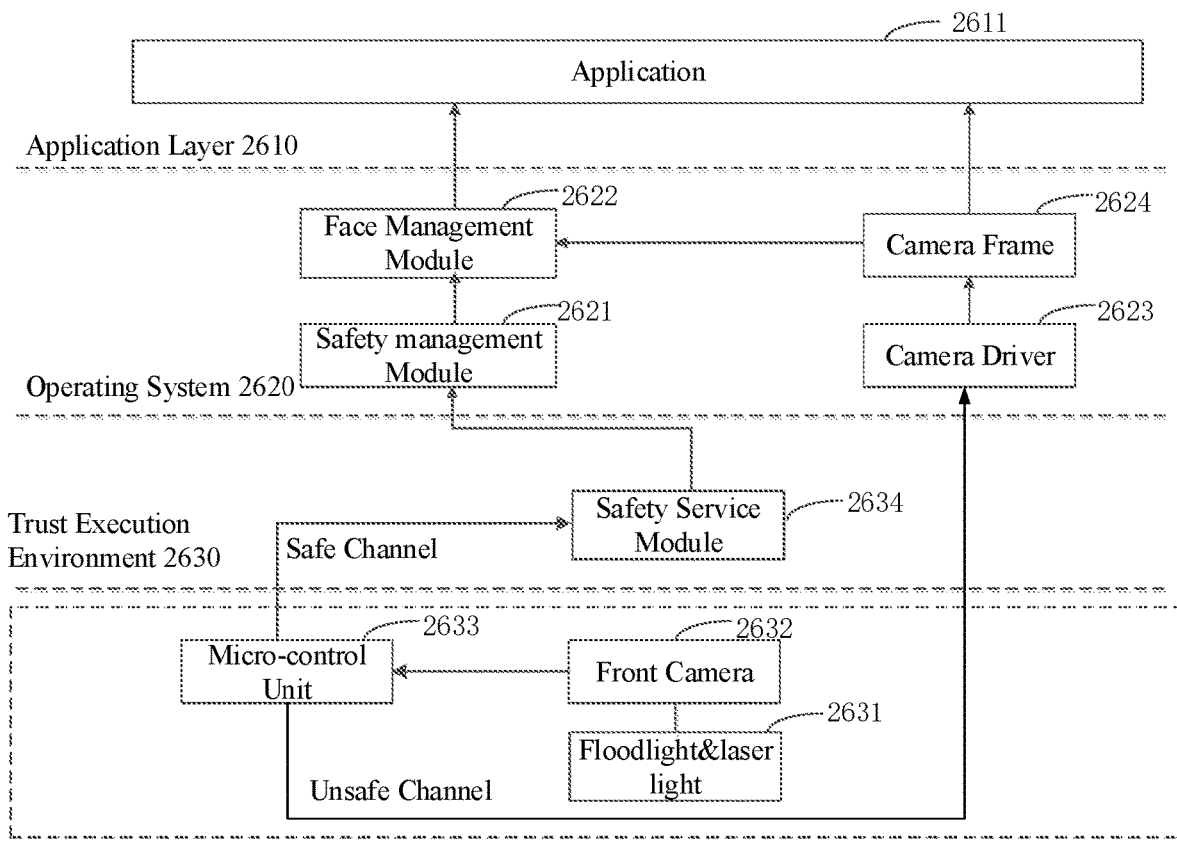
FIG. 18 is a diagram of a software architecture of an image processing method according to an embodiment.

FIG. 18 is a diagram of a software architecture of an image processing method according to an embodiment. As illustrated in FIG. 18, the software architecture includes an application layer 2610, an operating system 2620, and a trusted execution environment 2630. Modules in the trusted execution environment 2630 include a safety service module 2634. The hardware layer includes a floodlight&laser light 2631, an infrared camera 2632, a micro-control unit 2633, and the like. The micro-control unit 2633 may secure data by controlling its input and output. The micro-control unit 2633 may acquire a safe infrared image and a safe speckle image by controlling the floodlight&laser light 2631 and the infrared camera 2632, and then send the infrared image and the target speckle image to the safety service module 2634 in the trusted execution environment 2630. The operating system 2620 includes a safety management module 2621, a face management module 2622, a camera driver 2623 and a camera frame 2624. The application layer 2610 includes an application 2611. The application 2611 may initiate the image acquisition instruction, and the electronic device may drive the floodlight&laser light 2631 and the infrared camera 2632 to work through the image acquisition instruction. For example, when an operation such as payment, unlocking and facial beautification is performed by obtaining a face, the application may initiate the image acquisition instruction for acquiring a face image. After acquiring the infrared image and the target speckle image, the camera may determine whether the currently acquired image is used for safe application operation or unsafe application operation according to the image acquisition instruction. When the acquired depth image is used for the safe application operation, the acquired infrared image and the acquired target speckle image are sent to the micro-control unit 2633 through the safe channel. And then, the micro-control unit 2633 obtains a parallax image through calculation according to the target speckle image and the reference speckle image, obtains the depth image through calculation according to the parallax image, and sends the depth image and the infrared image obtained through calculation to the safety service module 2634. It will be appreciated that the process of obtaining the depth image through calculation according to the target speckle image may also be performed in the safety service module 2634. The safety service module 2634 sends the infrared image and depth image to the safety management module 2621. Generally, different applications 2611 have corresponding safety management modules 2621. The safety management module 2621 sends the depth image and the infrared image to a corresponding face management module 2622. The face management module 2622 performs processing such as the face detection, recognition, and verification according to the infrared image and the depth image, and then sends the processing result to the upper application 2611 that performs a safety application operation according to the processing result. When the acquired depth image is used for an unsafe application such as facial beautification, AR (augmented reality), etc., the infrared image and the target speckle image acquired by the infrared camera 2632 may be directly sent to the camera driver 2623 through a unsafe channel, and the camera driver 2623 may calculate the parallax image according to a target speckle image and calculate a depth image according to the parallax image. The camera driver 2623 may send the infrared image and the depth image to the camera frame 2624, and then the camera frame 2624 sends the infrared image and the depth image to the face management module 2622 or the application 2611. The switching between the safe channel and the unsafe channel is performed by the micro-control unit 2633.

It should be understood that although the blocks in the flow charts of FIGS. 15, 16 and 17 are illustrated in sequence as indicated by arrows, the blocks are not necessarily performed in sequence as indicated by the arrows. The blocks are not strictly ordered to perform, and the blocks may be performed in other orders, unless explicitly stated herein. Moreover, at least a portion of the blocks in FIGS. 15, 16 and 17 may include several sub-steps or stages. Instead of being performed at the same time necessarily, the sub-steps or stages may be performed at different times. And the sub-steps or stages may be performed alternately with other steps or at least a portion of the sub-steps or stages of other steps, rather than being necessarily performed sequentially.

FIG. 10 is a structure block diagram of an image processing device according to an embodiment. As illustrated in FIG. 10, the image processing device 800 includes the total acquisition module 802 and the total processing module 804. The total acquisition module 802 is configured to control the camera module to acquire the target image in response to the first processing unit receiving the image acquisition instruction. The total processing module 804 is configured to perform the predetermined processing on the target image.

Figure 19:
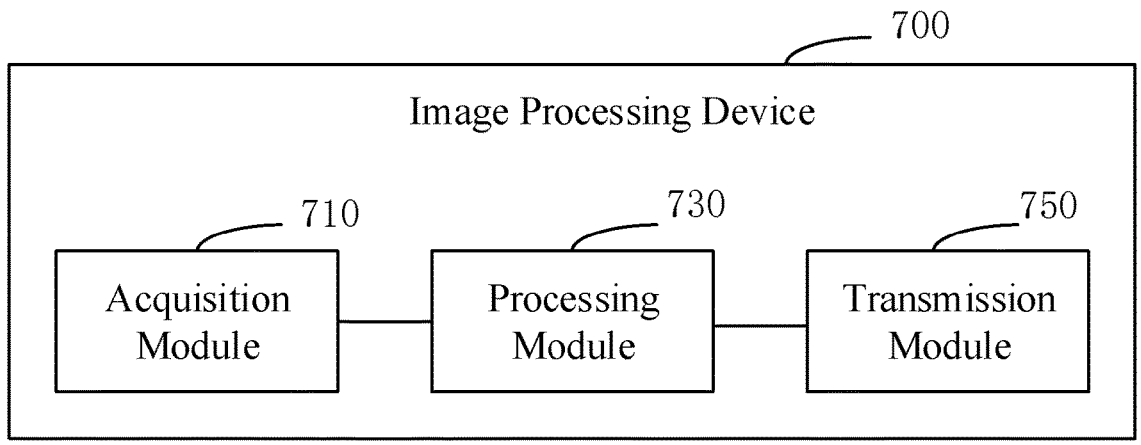
FIG. 19 is a structure block diagram of an image processing device according to an embodiment.

Specifically, as illustrated in FIG. 19, the total acquisition module 802 includes an acquisition module 710, and the total processing module 804 includes a processing module 730 and a transmission module 750. That is, the image processing device 700 includes the acquisition module 710, the processing module 730 and the transmission module 750.

The acquisition module 710 is configured to control the camera module to acquire the target image in response to the first processing unit receiving the image acquisition instruction sent by the second processing unit.

The processing module 730 is configured to acquire the first image according to the target image.

The transmission module 750 is configured to send the first image to the safety processing unit, to obtain the processing result by processing the first image through the safety processing unit, and to send the processing result to the second processing unit in the first execution environment.

In an embodiment, the target image includes the target speckle image. The processing module 730 is further configured to acquire the reference speckle image with the reference depth information; to obtain a matching result by matching the reference speckle image with the target speckle image; and to obtain the first image according to the matching result, the first image being the parallax image with the offset information of corresponding points in the target speckle image and the reference speckle image.

In an embodiment, the target image includes the target speckle image. The processing module 730 is further configured to acquire the reference speckle image with the reference depth information; to obtain the matching result by matching the reference speckle image with the target speckle image; and to obtain the first image according to the reference depth information and the matching result, the first image being the depth image with the depth information.

In an embodiment, the processing module 730 is further configured to perform the face recognition according to the infrared image; when the first image is the parallax image, to obtain the corresponding depth image according to the first image by the safety processing unit, and to perform the living-body detection according to the infrared image and the depth image; and when the first image is the depth image, to perform the living-body detection according to the infrared image and the first image by the safety processing unit.

In an embodiment, the processing module 730 is further configured to receive the data obtaining request of the application, and to obtain the safety level of the application; to search for the accuracy level corresponding to the safety level; and to adjust the accuracy of the depth image according to the accuracy level, and to send the adjusted depth image to the application.

In an embodiment, the processing module 730 is further configured to adjust the resolution of the depth image according to the accuracy level; or, to adjust the number of points in the target speckle image acquired by the camera module according to the accuracy level.

In an embodiment, the processing module 730 is further configured to receive the data obtaining request of the application, and to obtain the safety level of the application; to determine the corresponding data transmission channel according to the safety level; and to send the first image to the application via the corresponding data transmission channel.

In an embodiment, the processing module 730 is further configured to, operate the camera module to acquire the infrared image and the target speckle image in response to the first processing unit receiving the image acquisition instruction sent by the second processing unit in the first execution environment according to the verification request of the application; to acquire the depth image according to the target speckle image, to send the acquired infrared image and depth image to the safety processing unit that compares the acquired infrared image with the stored infrared image, and compares the acquired depth image with the stored depth image to obtain the verification result, and to send the verification result to the second processing unit in the first execution environment; and to send the verification result to the server corresponding to the application via the data safety transmission channel.

An embodiment of the present disclosure further provides an electronic device. An internal structure of the electronic device is illustrated in FIG. 14. The electronic device includes the camera module 210, the first processing unit 220, the second processing unit 230 and the safety processing unit 240. The first processing unit 220 is connected to the camera module 210, the second processing unit 230 and the safety processing unit 240, respectively. The safety processing unit 240 is connected to the second processing unit 230. The first processing unit 220 is configured to control the camera module 210 to acquire the target image according to the image acquisition instruction when the image acquisition instruction is received. Specifically, the first processing unit 220 is configured to receive the image acquisition instruction sent by the second processing unit 230, and to control the camera module 210 to acquire the target image according to the image acquisition instruction. The electronic device is configured to perform the predetermined processing on the target image, and specifically includes the followings.

The first processing unit 220 acquires the first image according to the target image and sends the first image to the safety processing unit 240.

The safety processing unit 240 processes the first image to obtain a processing result, and sends the processing result to the second processing unit 230.

Specifically, the first processing unit 220 may be a microprocessor, the second processing unit 230 may be a central processing unit, the safety processing unit 240 may be a stand-alone embedded processor or may be a safe single-core processor divided from a multi-core processor in the second processing unit 230, etc., and parallel or serial processing may be performed on data. The second processing unit 230 performs the serial processing on the data in the first execution environment. The first execution environment is referred to as the TEE. The second processing unit 230 may also process the data in the REE environment. The first processing unit 220 calculates the target speckle image and the reference speckle image to obtain the parallax image with the offset information. The safety processing unit 240 obtains the depth image through calculation according to the parallax image with the offset information.

According to the electronic device in the embodiment of the present disclosure, the first processing unit 220 controls the camera module 210 to acquire the target image by receiving the image acquisition instruction sent by the second processing unit 230, obtains the first image according to the target image and sends the first image to the safety processing unit for processing. The data processing may be performed on the acquired target image by both the first processing unit 220 and the safety processing unit 240, so that the data processing speed is increased.

In an embodiment, the first processing unit 220 may receive the image acquisition instruction sent by the second processing unit 230 in the trusted execution environment, and control the camera module 210 to acquire the target image according to the image acquisition instruction. Therefore, the acquisition instruction and the data processing process are performed in a safe environment, and thus the safety of data may be ensured.

In an embodiment, the camera module 210 includes the first projector, the second projector and the first image acquisition unit connected to the first processing unit 220, respectively.

The first processing unit 220 is further configured to control the first projector to emit the infrared light and the second projector to emit the structured-light pattern. The first image acquisition unit is configured to acquire the infrared image and the target speckle image, and to send the acquired infrared image and target speckle image to the first processing unit.

The first image acquisition unit may be a laser camera. The first projector may be the floodlight. The second projector may be the laser light. The laser light may include a light source, a lens and a structured-light-pattern generator. The first image acquisition unit and the second projector are positioned on the same plane.

In an embodiment, the target image includes the target speckle image. The first processing unit 220 is further configured to acquire the reference speckle image with the reference depth information; to obtain a matching result by matching the reference speckle image with the target speckle image; and to obtain the first image according to the matching result, the first image being the parallax image with the offset information of corresponding points in the target speckle image and the reference speckle image.

In an embodiment, the target image includes the target speckle image. The first processing unit 220 is further configured to acquire the reference speckle image with the reference depth information; to obtain the matching result by matching the reference speckle image with the target speckle image; and to obtain the first image according to the reference depth information and the matching result, the first image being the depth image with the depth information.

In an embodiment, controlling the camera module to acquire the infrared image and the depth image includes: the time interval between the acquisition of the infrared image and the acquisition of the depth image by the camera module being less than the first threshold.

The method for acquiring the infrared image and the depth image by the electronic device includes that: the electronic device turns on the floodlight 214 and acquires the infrared image through the laser camera 212; and turns on the laser light 218 and acquires the depth image through the laser camera 212. When the electronic device acquires the infrared image and the depth image, in order to ensure the accuracy of the acquired data, the smaller the time interval between the acquisition of the infrared image and the acquisition of the depth image, the better.

In an embodiment, the electronic device may further include a first projector controller and a second projector controller. The first processing unit is connected to the first projector controller and the second projector controller, respectively, through two PWMs. When the first processing unit needs to control the first projector or the second projector to be turned on, the first processing unit may transmit a pulse wave to the first projector controller through the PWM to control the floodlight to be turned on or transmit a pulse wave to the second projector controller through the PWM to control the laser light to be turned on. The time interval between the acquisition of the infrared image and the depth image is controlled by transmitting pulse waves to the two controllers through the PWMs, respectively.

In an embodiment, the electronic device may include a controller that controls the first projector and the second projector. The first processing unit is connected to the controller through a PWM. When the first processing unit needs to control the first projector or the second projector to be turned on, the first processing unit transmits a pulse wave to the controller through the PWM to turn on the first projector or the second projector. The second processing unit controls switching between the first projector and the second projector. The time interval between the acquisition of the infrared image and the depth image being less than the first threshold may be implemented by controlling the time interval of switching between the first projector and the second projector. The first threshold may be a value set by the user or a value set by the electronic device, which may be, for example, 1 millisecond.

In an embodiment, the safety processing unit 240 is further configured to perform the face recognition according to the infrared image.

When the first image is the parallax image, the safety processing unit acquires a corresponding depth image according to the first image and performs the living-body detection according to the infrared image and the depth image.

When the first image is the depth image, the safety processing unit performs the living-body detection according to the infrared image and the first image.

In an embodiment, the second processing unit 230 is further configured to receive the data obtaining request of the application, to acquire the safety level of the application, to search for the accuracy level corresponding to the safety level, to adjust the accuracy of the depth image according to the accuracy level, and to send the adjusted depth image to the application.

In an embodiment, the second processing unit 230 is further configured to adjust the resolution of the depth image according to the accuracy level.

In an embodiment, the second processing unit 230 is further configured to adjust the number of points in the target speckle image acquired by the camera module 210 according to the accuracy level.

In an embodiment, the second processing unit 230 is further configured to receive the data obtaining request of the application, to obtain the safety level of the application, to determine a corresponding data transmission channel according to the safety level, and to send the first image to the application through the corresponding data transmission channel.

In an embodiment, the first processing unit 220 is further configured to receive the image acquisition instruction sent by the second processing unit 230 in the first execution environment according to the verification request of the application, to control the camera module 210 to acquire the infrared image and the target speckle image according to the image acquisition instruction, to acquire the depth image according to the target speckle image, and to send the acquired infrared image and depth image to the safety processing unit 240. The safety processing unit 240 is further configured to compare the acquired infrared image with the stored infrared image, to compare the acquired depth image with the stored depth image to obtain the verification result, and to send the verification result to the second processing unit 230 in the first execution environment. The second processing unit 230 sends the verification result to the server corresponding to the application via the data safety transmission channel.

Embodiment 3

Figure 20:
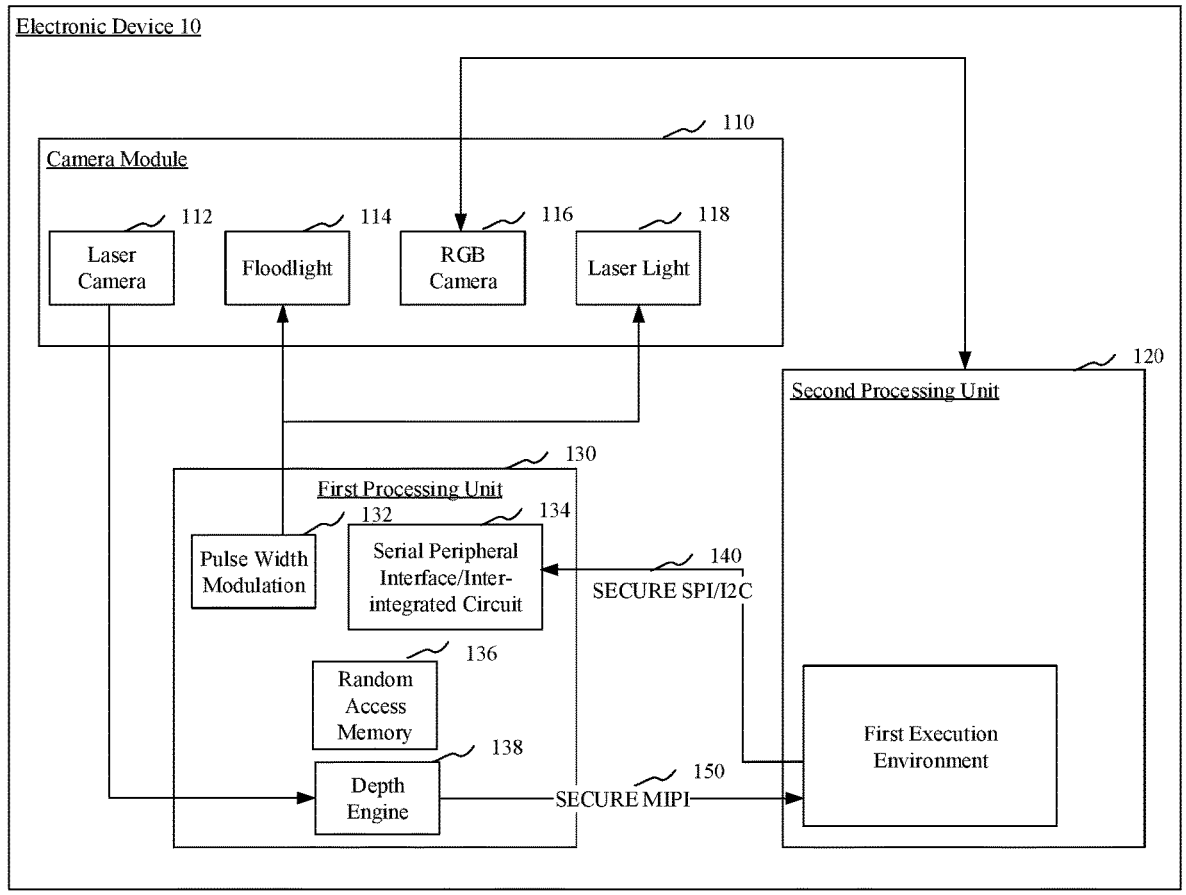
FIG. 20 is a diagram of an application scenario of an image processing method according to an embodiment.

FIG. 20 is a diagram of an application scenario of an image processing method according to an embodiment. As illustrated in FIG. 20, the electronic device 10 may include the camera module 110, the second processing unit 120 and the first processing unit 130. The second processing unit 120 may be the CPU module. The first processing unit 130 may be the MCU module 130. The first processing unit 130 is connected between the second processing unit 120 and the camera module 110, and may control the laser camera 112, the floodlight 114 and the laser light 118 in the camera module 110. The second processing unit 120 may control the RGB camera 116 in the camera module 110.

The camera module 110 includes the laser camera 112, the floodlight 114, the RGB camera 116 and the laser light 118. The laser camera 112 is the infrared camera and is configured to acquire the infrared image. The floodlight 114 is a surface light source capable of emitting the infrared light, and the laser light 118 is a patterned point light source that emits the laser light. When the floodlight 114 is a surface light source, the laser camera 112 may obtain the infrared image according to reflected light. When the laser light 118 is a point light source, the laser camera 112 may acquire the speckle image according to the reflected light. The speckle image is an image generated when a pattern in patterned laser emitted by the laser light 118 is deformed.

The second processing unit 120 may include the CPU core that operates in the TEE and the CPU core that operates in the REE. The TEE and the REE are both operation modes of the ARM modules. The TEE has a high safety level, and only one CPU core in the second processing unit 120 may be operated in the TEE. In general, operation behaviors with a high safety level in the electronic device 10 need to be executed in the CPU core in the TEE, and operation behaviors with a low safety level may be executed in the CPU core in the REE.

The first processing unit 130 includes the PWM module 132, the SPI/I2C interface 134, the RAM module 136 and the depth engine 138. The PWM module 132 may send a pulse to the camera module to control the floodlight 114 or the laser light 118 to be turned on, so that the laser camera 112 may acquire the infrared image or the speckle image. The SPI/I2C interface 134 is configured to receive the image acquisition instruction sent by the second processing unit 120. The depth engine 138 may process the speckle image to obtain a depth parallax image.

In response to the second processing unit 120 receiving the data obtaining request of the application, for example, when the application needs to perform unlocking or payment with a face, the image acquisition instruction may be sent to the first processing unit 130 through the CPU core running in the TEE. In response to the first processing unit 130 receiving the image acquisition instruction, the PWM module 132 may transmit a pulse wave to control the floodlight 114 in the camera module 110 to be turned on and acquire the infrared image through the laser camera 112, and to control the laser light 118 in the camera module 110 to be turned on and acquire the speckle image through the laser camera 112. The camera module 110 may send the acquired infrared image and speckle image to the first processing unit 130. The first processing unit 130 may process the received infrared image to obtain the infrared parallax image; and process the received speckle image to obtain the speckle parallax image or the depth parallax image. Processing the infrared image and the speckle image by the first processing unit 130 means to correct the infrared image or the speckle image, and to remove an influence of internal and external parameters of the camera module 110 on the image. The first processing unit 130 may be set to different modes, and images output by the different modes are different. In response to the first processing unit 130 being set to a speckle image mode, the first processing unit 130 processes the speckle image to obtain the speckle parallax image, and the target speckle image may be obtained according to the speckle parallax image. In response to the first processing unit 130 being set to a depth image mode, the first processing unit 130 processes the speckle image to obtain the depth parallax image, and obtains the depth image according to the depth parallax image, in which the depth image is an image with the depth information. The first processing unit 130 may send the infrared parallax image and the speckle parallax image to the second processing unit 120, and the first processing unit 130 may also send the infrared parallax image and the depth parallax image to the second processing unit 120. The second processing unit 120 may obtain the target infrared image according to the infrared parallax image and obtain the depth image according to the depth parallax image. Further, the second processing unit 120 may perform the face recognition, the face matching and the living-body detection, and may acquire the depth information of the detected face according to the target infrared image and the depth image.

The first processing unit 130 communicates with the second processing unit 120 via a fixed secure interface to ensure the safety of data transmission. As illustrated in FIG. 20, the second processing unit 120 sends data to the first processing unit 130 through SECURE SPI/I2C 140, and the first processing unit 130 sends data to the second processing unit 120 through a SECURE MIPI (Mobile Industry Processor Interface) 150.

In an embodiment, the first processing unit 130 may further acquire the target infrared image according to the infrared parallax image, acquire the depth image through calculation according to the depth parallax image, and send the target infrared image and the depth image to the second processing unit 120.

In an embodiment, the first processing unit 130 may perform the face recognition, the face matching, the living-body detection, and may acquire the depth information of the detected face according to the target infrared image and the depth image. Sending the image to the second processing unit 120 by the first processing unit 130 means that the first processing unit 130 sends the image to the CPU core in the TEE in the second processing unit 120.

The electronic device according to the embodiment of the present disclosure may be a mobile phone, a tablet computer, a personal digital assistant, a wearable device or the like.

FIG. 2 is a flow chart of an image processing method according to an embodiment. As illustrated in FIG. 2, the image processing method includes block 02 and block 04.

At block 02, the first processing unit operates the camera module to acquire the target image in response to receiving the image acquisition instruction.

At block 04, the predetermined processing is performed on the target image.

Figure 21:
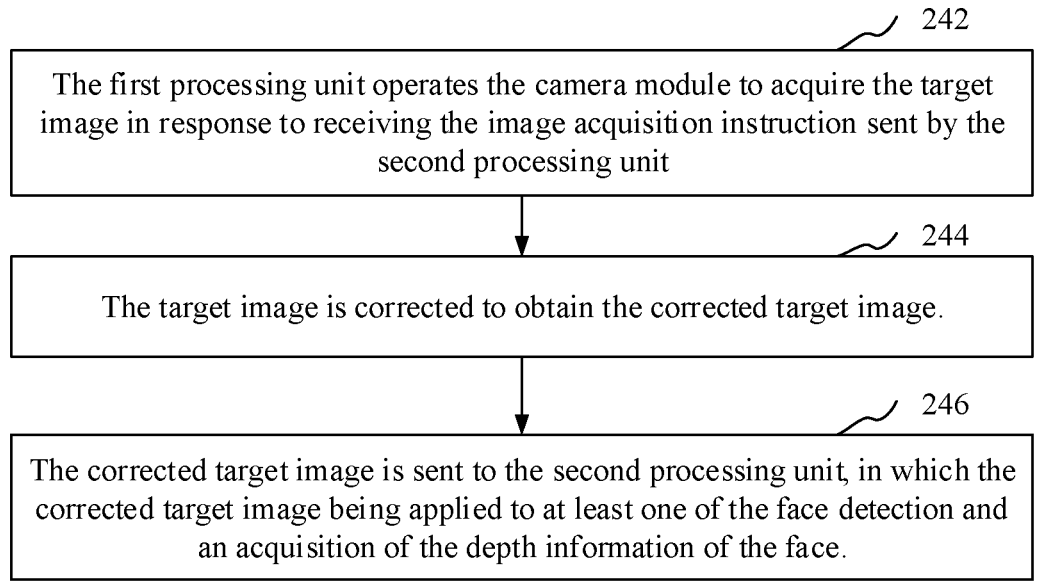
FIG. 21 is a flow chart of an image processing method according to an embodiment.

Specifically, as illustrated in FIG. 21, block 02 includes block 242, and block 04 includes blocks 244 and 246. That is, the image processing method includes block 242, block 244 and block 246.

At block 242, the first processing unit operates the camera module to acquire the target image in response to receiving the image acquisition instruction sent by the second processing unit.

The first processing unit refers to a processor for processing data, such as the MCU module 130 as illustrated in FIG. 20. The second processing unit refers to a processor for processing data, such as the CPU module 120 as illustrated in FIG. 20. The first processing unit is connected between the second processing unit and the camera module, and may control the camera module according to an instruction of the first processing unit. The second processing unit may be operated in the first execution environment. The first processing unit operates the camera module to acquire the target image in response to receiving the image acquisition instruction sent by the second processing unit in the first execution environment. The first execution environment refers to an execution environment with a high safety level, such as the TEE. Optionally, the electronic device further includes a second execution environment, which refers to an execution environment with a low safety level, such as the REE. The target image includes the infrared image and the speckle image.

When the application in the electronic device needs to acquire the face depth information, the data obtaining request may be sent to the second processing unit, and the data obtaining request may include a face depth information acquisition instruction, a RGB image acquisition instruction, and so on. When the second processing unit receives the data obtaining request, when the data obtaining request is detected to include the face depth information acquisition instruction, the current second processing unit is switched to the first execution environment, and thus the image acquisition instruction is sent to the first processing unit through the second processing unit in the first execution environment. The image acquisition instruction may include acquiring the infrared image and the speckle image. Optionally, the image acquisition instruction may further include acquiring the RGB image.

In response to receiving the image acquisition instruction, the first processing unit may operates the floodlight in the camera module to be turned on and acquire the infrared image through the laser camera, and may operates the laser light in the camera module to be turned on and acquire the speckle image through the laser camera. The first processing unit controls the floodlight or the laser light to be turned on by transmitting a pulse. The floodlight emits infrared light and the laser light emits laser. The laser emitted by the laser light may be diffracted by a collimating lens and a DOE (diffractive optical element) in a structured-light module. And then, the laser light emits an image formed by diffraction, and the laser camera generates a speckle image according to reflected light.

At block 244, the target image is corrected to obtain the corrected target image.

After the laser camera acquires the infrared image and the speckle image, the infrared image and the speckle image may be sent to the first processing unit. And then, the first processing unit may correct the infrared image and the speckle image, respectively, to obtain the corrected infrared image and the corrected speckle image. Correcting the infrared image and the speckle image respectively by the first processing unit means correcting internal and external parameters in the infrared image and the speckle image, such as a deflection angle of the laser camera and the laser camera. The corrected infrared image may be obtained after correction, and the corrected infrared image is the infrared parallax image; and the corrected speckle image may be the speckle parallax image or the depth parallax image. The parallax image is an image expressing a parallax value from a standard image. The standard image, i.e., an image with the internal and external parameters corrected, may be obtained according to the parallax value in the parallax image. For example, the target infrared image may be obtained according to the infrared parallax image, the target speckle image may be obtained according to the speckle parallax image, and the depth image may be obtained according to the depth parallax image. The target infrared image is an infrared image with the internal and external parameters corrected, the target speckle image is a speckle image with the internal and external parameters corrected, and the depth image is an image with depth information obtained after the internal and external parameters are corrected.

The first processing unit may be in different operation modes, and processing modes of the speckle images are different for different operation modes. When the first processing unit is set to be in the depth image mode, the first processing unit processes the speckle image to obtain the depth parallax image. When the first processing unit is set to be in the speckle image mode, the first processing unit processes the speckle image to obtain the speckle parallax image, and the target speckle image may be obtained according to the speckle parallax image.

At block 246, the corrected target image is sent to the second processing unit, in which the corrected target image being applied to at least one of the face detection and an acquisition of the depth information of the face.

The first processing unit may send the corrected infrared image and the corrected speckle image to the second processing unit in the first execution environment. For example, the first processing unit sends the infrared parallax image and the depth parallax image to the second processing unit in the TEE; or the first processing unit sends the infrared parallax image and the speckle parallax image to the second processing unit in the TEE. And when the first processing unit and the second processing unit are communicated, the communication channels are all safe channels. For example, the second processing unit sends the image acquisition instruction to the first processing unit through the SECURE SPI/I2C, and the first processing unit sends the image to the second processing unit through the SECURE MIPI. The first processing unit only performs data interaction with the second processing unit in the first execution environment, so that the safety of the data interaction may be ensured.

In response to the first processing unit sending the corrected infrared image and the corrected speckle image to the second processing unit in the first execution environment, the second processing unit may obtain the target infrared image according to the corrected infrared image, and obtain the target speckle image or the depth image according to the corrected speckle image. The second processing unit may perform the face detection according to the infrared image and the depth image, and the face detection may include the face recognition, the face matching, and the living-body detection. The face recognition refers to recognizing whether a face exists in an image, the face matching refers to matching the face in the image with a pre-stored face, and the living-body detection refers to detecting whether the face in the image has biological activity. When a face is detected to be present in the image and the face has biological activity, the second processing unit may further acquire the depth information of the detected face according to the infrared image and the depth image.

The second processing unit may send the depth information of the detected face to the application after acquiring the depth information of the detected face. The application may perform face unlocking, face payment, 3D facial beautification, three-dimensional modeling and the like according to the received depth information of the face.

Generally, when the second processing unit in the electronic device runs in the first execution environment, the processing speed is limited and the data processing efficiency is low. Taking the CPU cores of the electronic device as an example, there is only one CPU core in the TEE, that is, only one CPU core may process data in the TEE, so the efficiency of processing data is low.

According to the method in the embodiment of the present disclosure, the first processing unit is connected between the second processing unit and the camera module, so that the first processing unit may preprocess the image acquired by the camera module and send the preprocessed image to the second processing unit, so that the processing efficiency of the second processing unit is improved.

In an embodiment, the corrected target image includes the corrected infrared image and the corrected speckle image. The method for performing the face detection according to the corrected target image includes the followings.

The face recognition is performed according to the corrected infrared image to detect whether a first face exists. When the first face exists, the depth image is acquired according to the corrected speckle image. The living-body detection is performed according to the corrected infrared image and the depth image.

After receiving the corrected infrared image and the corrected speckle image, the second processing unit may acquire the target infrared image according to the corrected infrared image, and then perform the face recognition on the target infrared image to detect whether the first face exists in the target infrared image. The first face is a face existing in the target infrared image. When the first face exists in the target infrared image, the second processing unit may acquire the depth image according to the corrected speckle image, namely, the depth image is acquired according to the depth parallax image, and the living-body detection is performed according to the depth image. Performing the living-body detection according to the depth image includes: searching for a face area corresponding to a first face area in the depth image, and detecting whether the face area corresponding to the first face area has the depth information and whether the depth information accords with the rules of a stereoscopic face. When the face area corresponding to the first face area in the depth image has the depth information, and the depth information accords with the rules of a stereoscopic face, the first face has biological activity. The rules of a stereoscopic face are rules with three-dimensional depth information of a face. Optionally, the second processing unit may further perform artificial intelligent recognition on the target infrared image and the depth image by using the artificial intelligent model, obtain textures of the first face surface, and detect whether the texture directions, the texture densities and the texture widths conform to rules of a face. When the texture directions, the texture densities and the texture widths conform to the rules of a face, it is determined that the first face has biological activity.

In an embodiment, before acquiring the depth image according to the corrected speckle image, the method further includes the followings.

The first face is matched with a second face, and it is determined that the first face is successfully matched with the second face. The second face is a stored face.

After detecting that the first face exists in the target infrared image, the second processing unit may further match the first face with the second face. The second face is a stored face, for example, the face of the owner of the electronic device. The second face may be a face stored in the electronic device, or a face stored in the server. The second processing unit may set the first face successfully matched with the second face as the target face. After the first face and the second face are successfully matched, the second processing unit acquires the depth image and detects whether the target face has biological activity according to the target infrared image and the depth image. When the target face is detected to have biological activity, the depth information of the target face is acquired, and the depth information of the target face is sent to the application.

Optionally, after the first face is acquired, the second processing unit may perform the living-body detection on the first face to detect whether the first face has biological activity. When the first face is detected to have biological activity, the first face with biological activity is matched with the second face to obtain the target face that is matched successfully. The depth information of the target face is acquired according to the depth image and is sent to the application.

In response to the second processing unit receiving the data obtaining request, the second processing unit may identify whether the application only needs the depth information of the face or of the target face according to the data obtaining request. For example, when the depth information of the face is required for the 3D facial beautification, the second processing unit only needs to send the depth information of the recognized face to the application without recognizing whether it is the target face. When the depth information of the face is required for the face unlocking, the second processing unit needs to detect whether an identified face is the target face after identifying the face, and sends the depth information of the target face to the application when the identified face is the target face.

According to the method in the embodiment of the present disclosure, the second processing unit may determine the target face according to steps such as the face recognition, the face matching and the living-body detection, which is beneficial to quickly obtaining the depth information of the target face.

In an embodiment, controlling the camera module to acquire the target image according to the image acquisition instruction includes the followings.

The camera module is controlled to acquire the infrared image and the speckle image according to the image acquisition instruction. The time interval between the first time point of acquiring the infrared image and the second time point of acquiring the speckle image is less than the first threshold.

The first processing unit may control the infrared light in the camera module to be turned on and acquire the infrared image through the laser camera, and may further control the laser light in the camera module to be turned on and acquire the speckle image through the laser camera. In order to ensure the consistency of contents in the infrared image and the speckle image, the time interval between the first time point when the camera module acquires the infrared image and the second time point when the camera module acquires the speckle image is less than the first threshold. For example, the time interval between the first time point and the second time point is less than 5 milliseconds.

The method for controlling the camera module to acquire the infrared image and the speckle image by the first processing unit includes the followings.

(1) The floodlight controller and the laser light controller are arranged in the camera module. The first processing unit is respectively connected with the floodlight controller and the laser light controller through two PWMs. When the first processing unit needs to operate the floodlight to be turned on, a pulse wave may be transmitted to the floodlight controller through one PWM to control the floodlight to be turned on; and when the first processing unit needs to operate the laser light to be turned on, a pulse wave may be transmitted to the laser light controller through the other PWM to control the laser light to be turned on. The first processing unit may control the time interval of transmitting pulse waves to the floodlight controller and the laser light controller through the two PWMs, respectively, to enable the time interval between the first time point and the second time point to be less than the first threshold.

(2) A controller is arranged in the camera module and configured to control the floodlight and the laser light. The first processing unit is connected with the controller through one PWM. When the first processing unit needs to control the floodlight to be turned on, pulse waves may be transmitted to the floodlight controller through the PWM to control the floodlight to be turned on; and when the first processing unit needs to control the laser light to be turned on, the PWM may be controlled to be switched and pulse waves may be transmitted to the laser light controller to control the laser light to be turned on. The first processing unit controls the time interval of switching between the PWMs to enable the time interval between the first time point and the second time point to be less than the first threshold.

According to the method in the embodiment of the present disclosure, the time interval between the acquired infrared image and speckle image is lower than the first threshold, so that the consistency between the acquired infrared image and speckle image may be ensured, a larger error between the infrared image and the speckle image is avoided, and the accuracy of data processing is improved.

In an embodiment, the target image includes the infrared image and the speckle image. Controlling the camera module to acquire the target image according to the image acquisition instruction includes the followings.

The time stamp in the image acquisition instruction is obtained. It is determined that the time interval between the first time point of acquiring the infrared image and the time stamp is less than the second threshold. It is determined that the time interval between the second time point at which the speckle image was acquired and the time stamp is less than the third threshold.

The image acquisition instruction received by the second processing unit further includes the time stamp. The time stamp may be a time when the application sends the data obtaining request. After receiving the image acquisition instruction, the second processing unit may send the image acquisition instruction to the first processing unit, and the first processing unit controls the camera module to acquire the infrared image and the speckle image according to the image acquisition instruction. When the first processing unit operates the camera module to acquire the infrared image and the speckle image, it is required to determine that the time interval between the first time point of acquiring the infrared image and the time stamp is less than the second threshold, and the time interval between the second time point of acquiring the speckle image and the time stamp is less than the third threshold. The second threshold may be the same value or different values, for example, 3 seconds, 5 seconds, etc.

When the time interval between the first time point when the second processing unit acquires the infrared image and the time stamp is smaller than the second threshold, or the time interval between the second time point when the speckle image is acquired and the time stamp is less than the third threshold, the second processing unit may return an invalid instruction to the first processing unit, and the first processing unit may return the invalid instruction to the application sending the data obtaining request, so that the application resends the data obtaining request. According to the method in the embodiment of the present disclosure, the time interval between the first time point of acquiring the infrared image and the time stamp in the image acquisition instruction is controlled, and the time interval between the second time point of acquiring the speckle image and the time stamp in the image acquisition instruction is controlled, so that the timeliness of the acquired infrared image and the speckle image may be ensured.

Figure 22:
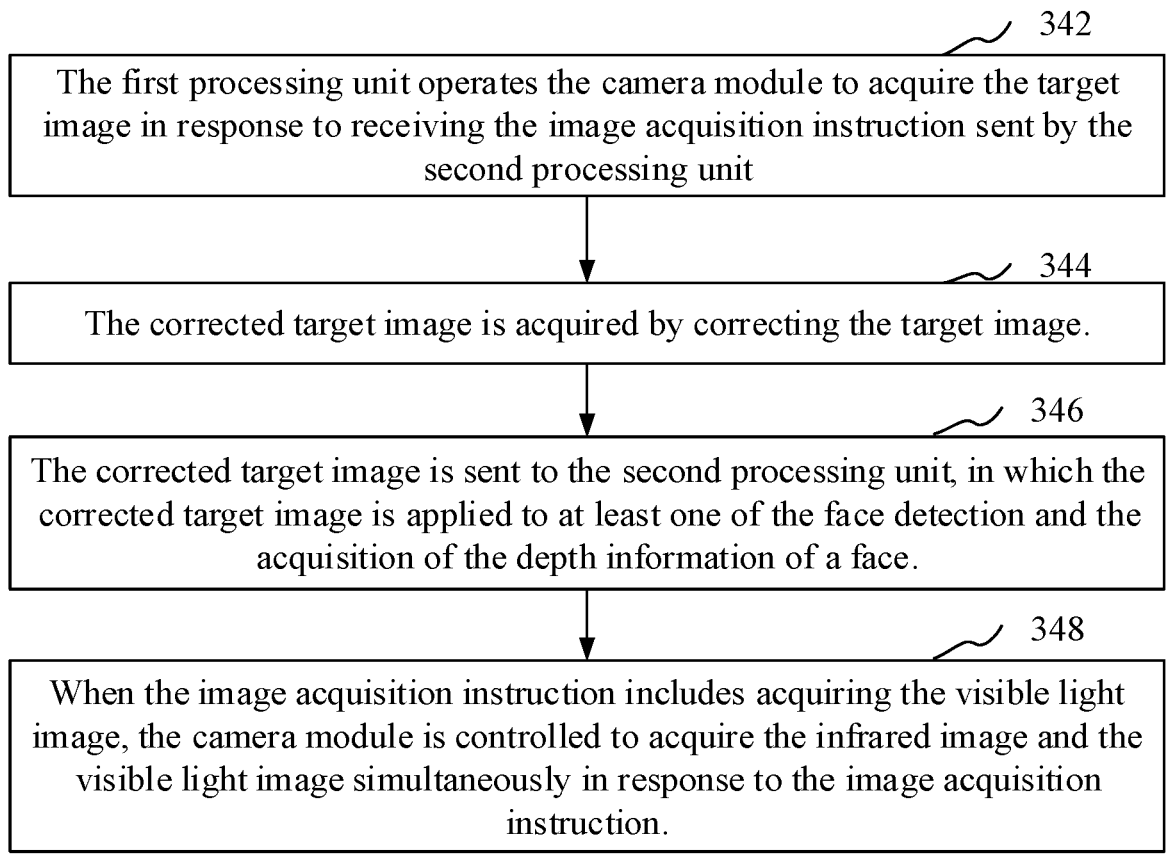
FIG. 22 is a flow chart of an image processing method according to another embodiment.

As illustrated in FIG. 22, in an embodiment, an image processing method includes the followings.

At block 342, the first processing unit operates the camera module to acquire the target image in response to receiving the image acquisition instruction sent by the second processing unit.

At block 344, the corrected target image is acquired by correcting the target image.

At block 346, the corrected target image is sent to the second processing unit, in which the corrected target image is applied to at least one of the face detection and the acquisition of the depth information of a face.

At block 348, when the image acquisition instruction includes acquiring the visible light image, the camera module is controlled to acquire the infrared image and the visible light image simultaneously according to the image acquisition instruction.

When the image acquisition instruction further includes acquiring the visible light image, the second processing unit may control the RGB camera in the camera module to acquire the visible light image. The first processing unit controls the laser camera to acquire the infrared image and the speckle image, and the second processing unit controls the RGB camera to acquire the visible light image. In order to ensure the consistency of the acquired images, a time sequence synchronization line may be added between the laser camera and the RGB camera, so that the camera module may acquire the infrared image and the visible light image simultaneously.

According to the method in the embodiment of the present disclosure, the infrared image and the visible light image are simultaneously acquired by controlling the camera module, so that the acquired infrared image and visible light image are consistent, and the accuracy of image processing is improved.

Figure 23:
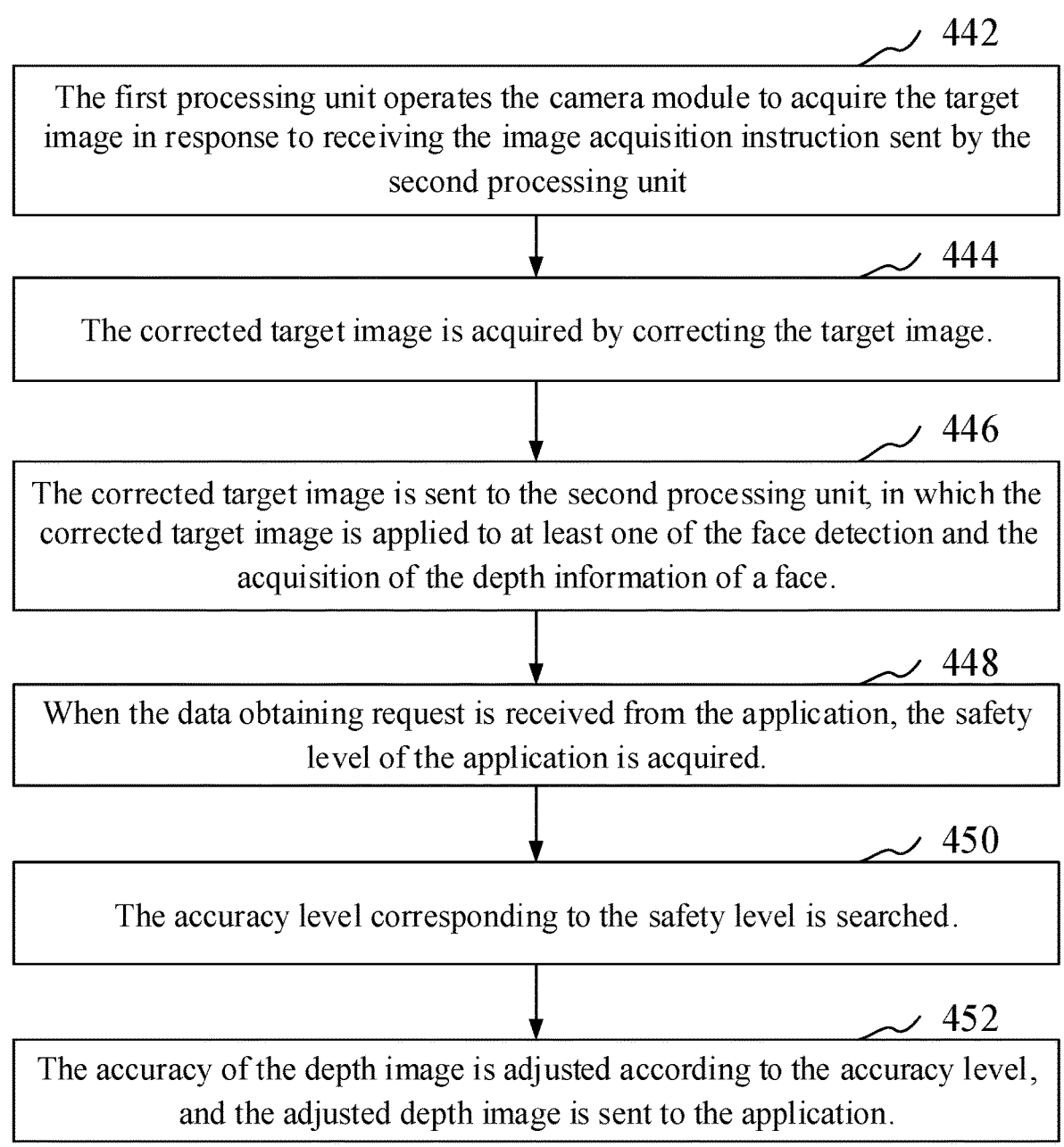
FIG. 23 is a flow chart of an image processing method according to yet another embodiment.

As illustrated in FIG. 23, in one embodiment, an image processing method includes the followings.

At block 442, the first processing unit operates the camera module to acquire the target image in response to receiving the image acquisition instruction sent by the second processing unit.

At block 444, the corrected target image is acquired by correcting the target image.

At block 446, the corrected target image is sent to the second processing unit, in which the corrected target image is applied to at least one of the face detection and the acquisition of the depth information of a face.

At block 448, in response to receiving the data obtaining request from the application, the safety level of the application is acquired.

At block 450, the accuracy level corresponding to the safety level is searched.

At block 452, the accuracy of the depth image is adjusted according to the accuracy level, and the adjusted depth image is sent to the application.

In response to the second processing unit receiving the data obtaining request of the application, the safety level of the application may be detected. The electronic device may set corresponding safety levels for applications, and applications at different safety levels correspond to different data accuracy levels. For example, the safety level of payment software in the electronic device is high, the accuracy of data sent by the second processing unit to the payment software is high, the safety level of image software is low, and the accuracy of data sent by the second processing unit to the image software is low.

After obtaining the safety level corresponding to the application, the second processing unit may search for the accuracy level corresponding to the safety level. The safety level is positively correlated with the accuracy level, that is, the higher the safety level of the application is, the higher the accuracy level corresponding to the safety level is. The higher the accuracy level, the sharper the image. After obtaining the accuracy level corresponding to the safety level of the application, the second unit may adjust the accuracy of the depth image according to the accuracy level, and then send the adjusted depth image to the application, so that the depth image may perform the face unlocking, the face payment, the 3D facial beautification, or the like according to the depth image.

In one embodiment, adjusting the accuracy of the target image according to the accuracy level includes: (1) adjusting the resolution of the depth image according to the accuracy level; and (2) adjusting the number of speckle points in the speckle image acquired by the camera module according to the accuracy level.

When the second processing unit adjusts the accuracy of the depth image, the resolution of the depth image may be adjusted. When the accuracy level of the depth image is high, the resolution of the depth image is high; and when the accuracy level of the depth image is low, the resolution of the depth image is low. Adjusting the resolution of the image may be implemented by adjusting the number of pixels in the image.

Different DOE diffraction elements may be preset in the laser light in the camera module, in which the numbers of speckle points formed through diffraction of different DOE diffraction elements are different. When the accuracy level corresponding to the application is high, the laser light may control the DOE diffraction element with many speckle points to emit laser, so that a speckle image with many speckle points is obtained; and when the accuracy level corresponding to the application is low, the laser light may control the DOE diffraction element with few speckle points to emit laser, so that a speckle image with few speckle points is obtained.

According to the method in the embodiment of the present disclosure, the accuracy of the depth image is adjusted according to the safety level of the application, so that the applications with different safety levels may acquire depth images with different accuracy, a risk of data leakage caused by the applications with low safety levels is reduced, and the safety of the data is improved.

Figure 24:
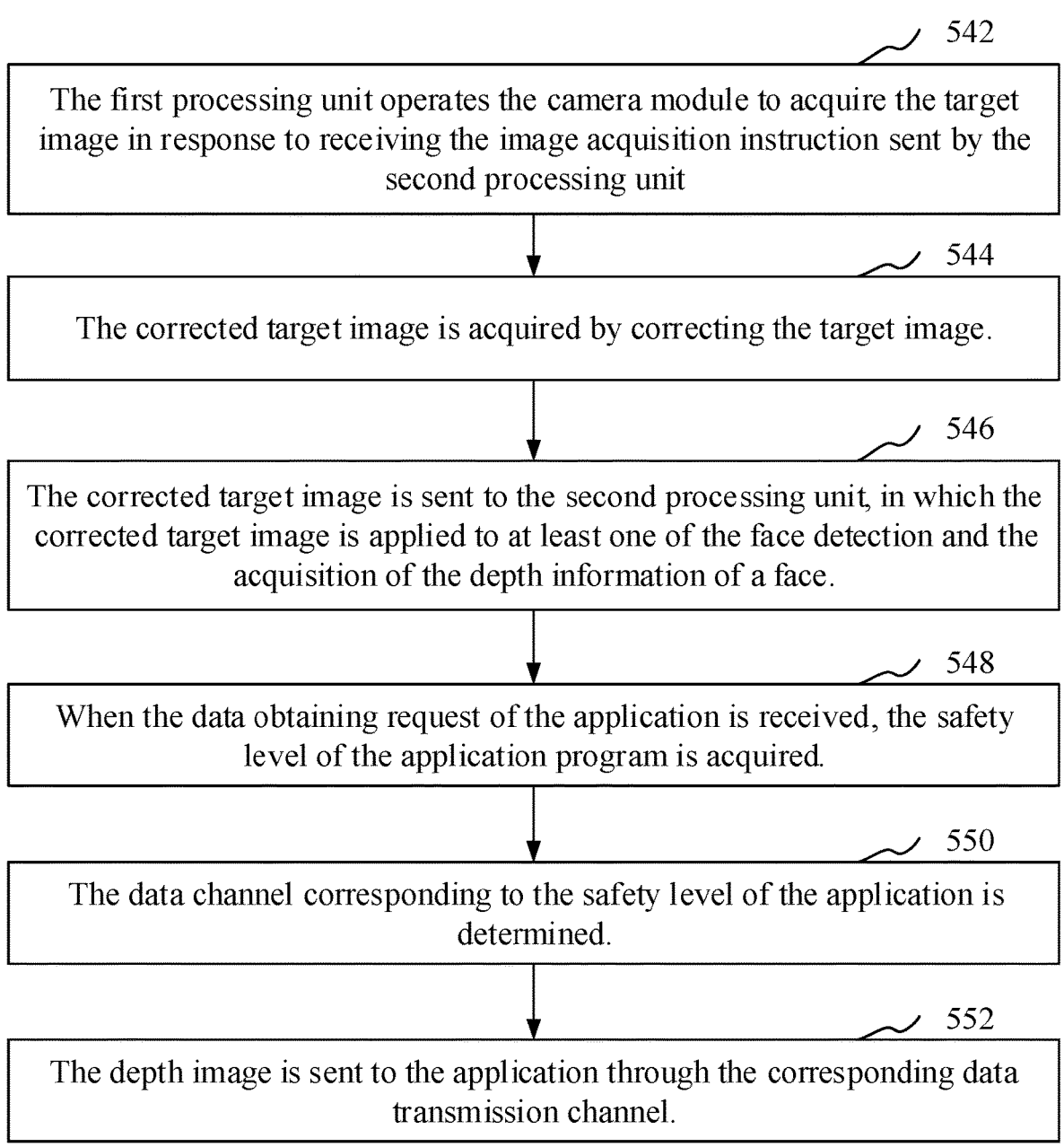
FIG. 24 is a flow chart of an image processing method according to still yet another embodiment.

As illustrated in FIG. 24, in one embodiment, an image processing method includes the followings.

At block 542, the first processing unit operates the camera module to acquire the target image in response to receiving the image acquisition instruction sent by the second processing unit.

At block 544, the corrected target image is acquired by correcting the target image.

At block 546, the corrected target image is sent to the second processing unit, in which the corrected target image is applied to at least one of the face detection and the acquisition of the depth information of a face.

At block 548, in response to receiving the data obtaining request of the application, the safety level of the application is acquired.

At block 550, the data channel corresponding to the safety level of the application is determined.

At block 552, the depth image is sent to the application through the corresponding data transmission channel.

The second processing unit may identify the safety level of the application after receiving the data obtaining request of the application. The second processing unit may transmit the depth image to the application through the safe channel or the normal channel. The safety level of the safe channel is different from that of the normal channel. Optionally, the safety level of the safe channel is high and the safety level of the normal channel is low. When data is transmitted in the safe channel, the data may be encrypted to prevent the data from being leaked or stolen. The electronic device may set corresponding data channels according to safety levels of applications. Optionally, an application with a high safety level may correspond to the safe channel, and an application with a low safety level may correspond to the normal channel. For example, the application for payment corresponds to the safe channel, and the application for images corresponds to the normal channel. After acquiring the data channel corresponding to the safety level of the application, the second processing unit may send the depth image to the application through the corresponding data channel, so that the application performs a following operation according to the depth image.

According to the method in the embodiment of the present disclosure, a corresponding data channel is selected to transmit data according to the safety level of the application, so that the safety in transmitting the data to an application with a high safety level is ensured. For an application with a low safety level, data is directly transmitted without an encryption operation, so that a speed in transmitting the data to an application with a low safety level is improved.

In one embodiment, an image processing method includes the followings.

(1) The first processing unit operates the camera module to acquire the target image in response to receiving the image acquisition instruction sent by the second processing unit.

(2) The corrected target image is acquired by correcting the target image.

(3) The corrected target image is sent to the second processing unit, in which the corrected target image is applied to at least one of the face detection and the acquisition of the depth information of a face.

Alternatively, the corrected target image includes the corrected infrared image and the corrected speckle image; and the method of performing the face detection according to the corrected target image includes: detecting whether a first face exists by performing the face recognition according to the corrected infrared image; when the first face exists, obtaining the depth image according to the corrected speckle image; and performing the living-body detection according to the corrected infrared image and the depth image.

Alternatively, before obtaining the depth image according to the corrected speckle image, the method further includes: matching the first face with a second face; and determining that the first face successfully matches with the second face, which is a stored face.

Alternatively, controlling the camera module to acquire the target image according to the image acquisition instruction includes: controlling the camera module to acquire the infrared image according to the image acquisition instruction; and controlling the camera module to acquire the speckle image according to the image acquisition module; in which, the time interval between the first time point when the infrared image is acquired and the second time point when the speckle image is acquired is less than the first threshold.

Alternatively, controlling the camera module to acquire the target image according to the image acquisition instruction includes: obtaining the time stamp in the image acquisition instruction; determining the time interval between the first time point when the infrared image is acquired and the time stamp is less than the second threshold; and determining the time interval between the second time point when the speckle image is acquired and the time stamp is less than the third threshold.

Alternatively, the target image includes the infrared image, and the method further includes: when the image acquisition instruction includes acquiring a visible light image, controlling the camera module to acquire the infrared image and the visible light image simultaneously according to the image acquisition instruction.

Alternatively, the method further includes: in response to receiving the data obtaining request of the application, obtaining the safety level of the application; searching for the accuracy level corresponding to the safety level; and adjusting the accuracy of the depth image according to the accuracy level, and sending the adjusted depth image to the application.

Alternatively, adjusting the accuracy of the target image according to the accuracy level includes: adjusting the resolution of the depth image according to the accuracy level; or, adjusting the number of the speckle points in the speckle image acquired by the camera module according to the accuracy level.

Alternatively, the method further includes: in response to receiving the data obtaining request of the application, obtaining the safety level of the application; determining a data channel corresponding to the safety level of the application; and sending the depth image to the application via the corresponding data transmission channel.

According to the method in the embodiment of the present disclosure, the first processing unit is connected between the second processing unit and the camera module, so that the first processing unit may preprocess the image acquired by the camera module, and then send the preprocessed image to the second processing unit, thereby improving the processing efficiency of the second processing unit. In addition, the first processing unit only performs data interaction with the second processing unit in the first execution environment, so that the safety of the data interaction may be ensured.

Figure 25:
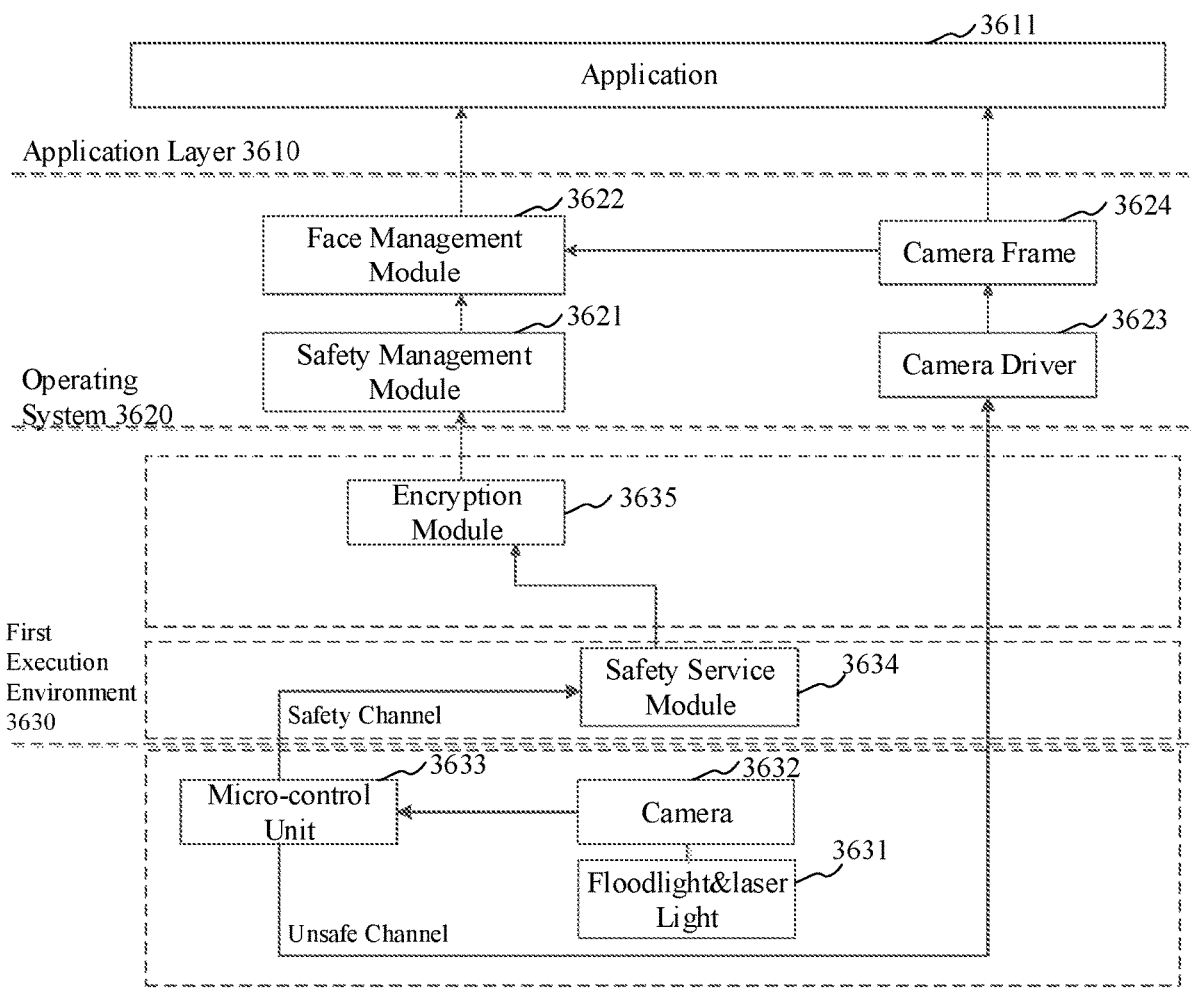
FIG. 25 is a diagram of a software architecture for implementing an image processing method according to an embodiment.

FIG. 25 is a diagram of a software architecture for implementing an image processing method according to an embodiment. As illustrated in FIG. 25, the software architecture includes an application layer 3610, an operating system 3620 and a first execution environment 3630. The first execution environment 3630 is a trusted execution environment. The hardware layer includes a floodlight&laser 3631, a camera 3632 and a micro-control unit 3633. A safety service module 3634 and an encryption module 3635 may operate under a first execution environment 3630. The safety service module 3634 may be the second processing unit running in the first execution environment 3630, such as a CPU core running in the TEE. The operating system 3620 includes a safety management module 3621, a face management module 3622, a camera drive 3623 and a camera frame 3624. The application layer 3610 includes an application 3611. The application 3611 may initiate an image acquisition instruction, and the electronic device drives the floodlight&laser 3631 and the camera 3632 to work according to the image acquisition instruction. For example, when an operation such as payment, unlocking or facial beautification is performed by capturing a face, the application may initiate an image acquisition instruction for capturing a face image. After the camera acquires the infrared image and the speckle image, whether the currently acquired image is used for safe application operation or unsafe application operation may be determined according to the image acquisition instruction. When the acquired depth image is applied to safety application operations such as payment and unlocking, the acquired infrared image and speckle image are sent to the micro-control unit 3633 through the safety channel. And then, the micro-control unit 3633 obtains the depth parallax image through calculation according to the speckle image, obtains the depth image according to the depth parallax image, and sends the depth image obtained through calculation and the infrared image to the safety service module 3634. It may be understood that the process of obtaining the depth image according to the speckle image may also be performed in the safety service module 3634. The safety service module 3634 sends the infrared image and the depth image to the encryption module 3635. The encryption module 3635 may encrypt the depth image and the infrared image according to the pre-stored speckle image, or may encrypt the depth image and the infrared image according to the speckle image acquired in real time, and then send the encrypted depth image and infrared image to the safety management module 3621. Generally, different applications 3611 have corresponding safety management modules 3621. The safety management modules 3621 decrypts the encrypted depth image and infrared image, and sends the depth image and infrared image obtained after decryption to corresponding face management modules 3622. The face management module 3622 performs face detection, recognition, verification and other processing according to the infrared image and the depth image, and then sends a processing result to the upper application 3611. The application 3611 performs safety application operation according to the processing result. When the acquired depth image is used for unsafe applications such as facial beautification and AR, the infrared image and the speckle image acquired by the camera 3632 may be directly transmitted to the camera driver 3623 through the unsafe channel. The camera driver 3623 may calculate a parallax image according to the speckle image and obtain the depth image through calculation according to the parallax image. The camera driver 3623 may send the infrared image and the depth image to the camera frame 3624, and then the camera frame 3624 sends the infrared image and the depth image to the face management module 3622 or the application 3611. The switching between the safe channel and the unsafe channel is performed by the micro-control unit 3633.

FIG. 10 is a structure diagram of an image processing device according to an embodiment. As illustrated in FIG. 10, the image processing device 800 includes the total acquisition module 802 and the total processing module 804. The total acquisition module 802 is configured to control the camera module to acquire the target image according to the image acquisition instruction in response to the first processing unit receiving the image acquisition instruction. The total processing module 804 is configured to perform the predetermined processing on the target image.

Figure 26:
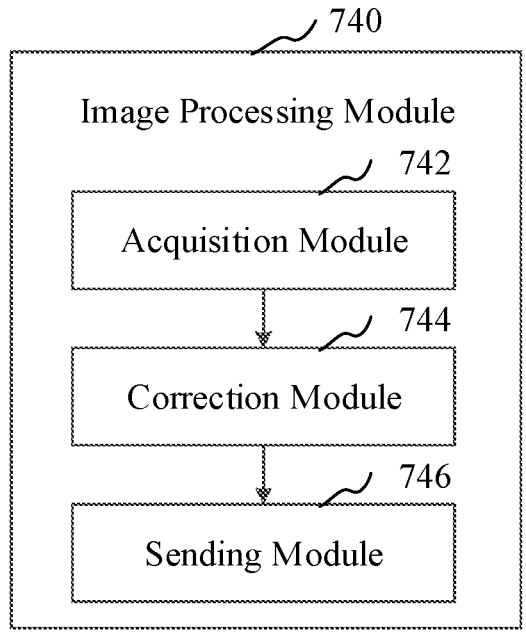
FIG. 26 is a structure block diagram of an image processing device according to an embodiment.

Specifically, as illustrated in FIG. 26, the total acquisition module 802 includes an acquisition module 742, and the total processing module 804 includes a correction module 744 and a sending module 746. That is, the image processing device 740 includes the acquisition module 742, the correction module 744 and the sending module 746.

The acquisition module 742 is configured to control the camera module to acquire the target image according to the image acquisition instruction in response to the first processing unit receiving the image acquisition instruction sent by the second processing unit.

The correction module 744 is configured to obtain the corrected target image by correcting the target image.

The sending module 746 is configured to send the corrected target image to the second processing unit, in which the corrected target image is applied to at least one of the face detection and the acquisition of the depth information of a face.

Figure 27:
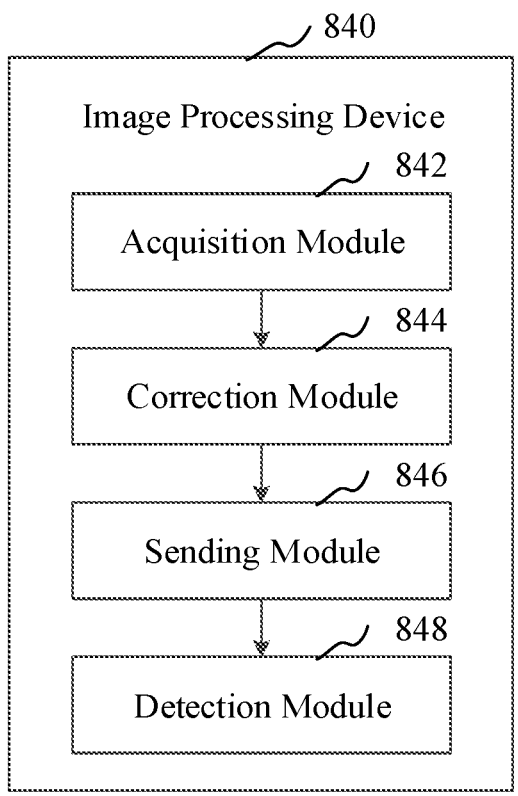
FIG. 27 is a structure block diagram of an image processing device according to another embodiment.

FIG. 27 is a structure block diagram of an image processing device according to another embodiment. As illustrated in FIG. 27, an image processing device 840 includes an acquisition module 842, a correction module 844, a sending module 846 and a detection module 848. The acquisition module 842, the correction module 844 and the sending module 846 have the same functions as the corresponding modules in FIG. 26.

The corrected target image includes the corrected infrared image and the corrected speckle image. The method for the detection module 848 to perform the face detection according to the corrected target image includes: performing the face recognition according to the corrected infrared image to detect whether the first face exists; when the first face exists, acquiring the depth image according to the corrected speckle image; and performing the living-body detection according to the corrected infrared image and the corrected depth image.

In one embodiment, the detection module 848 is further configured to match the first face with the second face before acquiring the depth image according to the corrected speckle image; and determining that the first face and the second face are successfully matched. The second face is a stored face.

In one embodiment, controlling the camera module to acquire the target image according to the image acquisition instruction by the acquisition module 842 includes: controlling the camera module to acquire the infrared image according to the image acquisition instruction; and controlling the camera module to acquire the speckle image according to the image acquisition instruction; in which, the time interval between the first time point of acquiring the infrared image and the second time point of acquiring the speckle image is less than the first threshold.

In one embodiment, the target image includes the infrared image and the speckle image. Controlling the camera module to acquire the target image according to the image acquisition instruction by the acquisition module 842 includes: acquiring the time stamp in the image acquisition instruction; determining that the time interval between the first time point of acquiring the infrared image and the time stamp is less than the second threshold; and determining that the time interval between the second time point at which the speckle image was acquired and the time stamp is less than the third threshold.

In one embodiment, the target image includes the infrared image; the acquisition module 842 is further configured to control the camera module to acquire the infrared image and the visible light image simultaneously according to the image acquisition instruction when the image acquisition instruction includes acquiring the visible light image.

Figure 28:
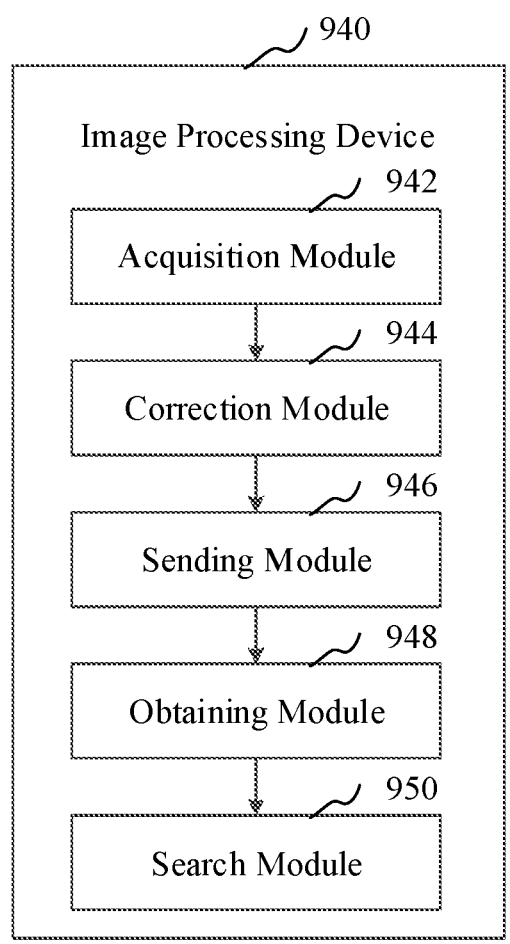
FIG. 28 is a structure block diagram of an image processing device according to yet another embodiment.

FIG. 28 is a structure block diagram of an image processing device according to yet another embodiment. As illustrated in FIG. 28, an image processing device 940 includes an acquisition module 942, a correction module 944, a sending module 946, an obtaining module 948 and a search module 950. The acquisition module 942, the correction module 944 and the sending module 946 have the same functions as the corresponding modules in FIG. 26.

The obtaining module 948 is configured to obtain a safety level of the application in response to receiving the data obtaining request of the application.

The search module 950 is configured to search for an accuracy level corresponding to the safety level.

The sending module 946 is further configured to adjust the accuracy of the depth image according to the accuracy level and to send the adjusted depth image to the application.

In one embodiment, adjusting, by the sending module 946, the accuracy of the target image according to the accuracy level includes: adjusting the resolution of the depth image according to the accuracy level; or adjusting the number of speckle points in the speckle image acquired by the camera module according to the accuracy level.

In one embodiment, the obtaining module 948 is configured to obtain the safety level of the application in response to receiving the data obtaining request of the application.

The search module 950 is further configured to determine a data channel corresponding to the safety level of the application.

The sending module 946 is further configured to send the depth image to the application through a corresponding data transmission channel.

An embodiment of the present disclosure further provides an electronic device, where the electronic device includes: a first processing unit 130, a second processing unit 120 and the camera module 110. The first processing unit 130 is connected to the second processing unit 120 and the camera module 110, respectively. The first processing unit 130 is configured to control the camera module 110 to acquire the target image in response to receiving the image acquisition instruction. Specifically, the first processing unit 130 is configured to receive the image acquisition instruction sent by the second processing unit 120, and to control the camera module 110 to acquire the target image according to the image acquisition instruction. The electronic device is configured to perform the predetermined processing on the target image, and specifically includes the followings.

The first processing unit 130 obtains the corrected target image by correcting the target image.

The first processing unit 130 sends the corrected target image to the second processing unit 120.

The second processing unit 120 performs at least one of the face detection and the acquisition of the depth information of a face according to the corrected target image.

In one embodiment, the corrected target image includes the corrected infrared image and the corrected speckle image; and performing, by the second processing unit 120, the face detection according to the corrected target image includes: detecting whether the first face exists by performing the face recognition according to the corrected infrared image; when the first face exists, obtaining the depth image according to the corrected speckle image; and performing the living-body detection according to the corrected infrared image and the depth image.

In one embodiment, the second processing unit 120 is further configured to, before obtaining the depth image according to the corrected speckle image, match the first face with a second face; and determine that the first face successfully matches with the second face, which is a stored face.

In one embodiment, controlling, by the first processing unit 130, the camera module 110 to acquire the target image according to the image acquisition instruction includes: controlling, by the first processing unit 130, the camera module 110 to acquire the infrared image according to the image acquisition instruction; and controlling, by the first processing unit 130, the camera module 110 to acquire the speckle image according to the image acquisition module; in which the time interval between the first time point when the infrared image is acquired and the second time point when the speckle image is acquired is less than the first threshold.

In one embodiment, the target image includes the infrared image and the speckle image; and controlling, by the first processing unit 130, the camera module 110 to acquire the target image according to the image acquisition instruction includes: obtaining the time stamp in the image acquisition instruction; determining the time interval between the first time point when the infrared image is acquired and the time stamp is less than the second threshold; and determining the time interval between the second time point when the speckle image is acquired and the time stamp is less than the third threshold.

In one embodiment, the target image includes the infrared image; and the first processing unit 130 is further configured to, when the image acquisition instruction includes acquiring a visible light image, control the camera module 110 to acquire the infrared image and the visible light image simultaneously according to the image acquisition instruction.

In one embodiment, the second processing unit 120 is further configured to, when the data obtaining request of the application is received, obtain the safety level of the application; to search for the accuracy level corresponding to the safety level; and to adjust the accuracy of the depth image according to the accuracy level, and to send the adjusted depth image to the application.

In one embodiment, adjusting, by the second processing unit 120, the accuracy of the target image according to the accuracy level includes: adjusting the resolution of the depth image according to the accuracy level; or, adjusting the number of the speckle points in the speckle image acquired by the camera module 110 according to the accuracy level.

In one embodiment, the second processing unit 120 is further configured to, when the data obtaining request of the application is received, obtain the safety level of the application; to determine a data channel corresponding to the safety level of the application; and to send the depth image to the application via the corresponding data transmission channel.

In embodiments 1, 2 and 3, the division of each module in the image processing device is for illustration only, and in other embodiments, the image processing device may be divided into different modules as required to complete all or part of the functions of the image processing device. For specific limitations of the image processing device, reference may be made to the above limitations of the image processing method corresponding to the image processing device, and details are not repeated here. Each module in the image processing device described above may be implemented in whole or in part by software, hardware, and a combination thereof. The modules may be embedded in or independent of a processor in the electronic device in the form of hardware, or may be stored in a memory in the electronic device in the form of software, so that the processor may call and execute operations corresponding to respective modules.

The implementation of each module in the image processing device provided in the embodiments of the present disclosure may be in the form of a computer program. The computer program may be run on a terminal or a server. Program modules constituting the computer program may be stored on a memory in the terminal or the server. When executed by a processor, the computer program performs steps of the method described in the embodiments of the present disclosure.

The embodiment of the present disclosure also provides a computer readable storage medium. One or more non-volatile computer readable storage media include a computer executable instruction. When the one or more processors execute the computer executable instruction, the one or more processors are configured to perform the image processing methods according to embodiments 1, 2 and 3 described above.

The embodiments of the present disclosure further provide a computer program product containing instructions. When a computer executes the product, the computer is configured to execute the image processing methods according to embodiments 1, 2 and 3 described above.

Any reference to memory, storage, database, or other media used herein may include non-volatile and/or volatile memory. The non-volatile memory may include a read only memory (ROM), a programmable ROM (PROM), an electrically programmable ROM (EPROM), an electrically erasable programmable ROM (EEPROM), or a flash memory. The volatile memory may include a random access memory (RAM), which acts as an external cache memory. By way of illustration, rather than limitation, the RAM is available in a variety of forms such as a static RAM (SRAM), a dynamic RAM (DRAM), a synchronous DRAM (SDRAM), a double data rate SDRAM (DDR SDRAM), an enhanced SDRAM (ESDRAM), a Synclink DRAM (SLDRAM), a Rambus direct RAM (RDRAM), a direct Rambus dynamic RAM (DRDRAM), and a Rambus dynamic RAM (RDRAM).

The above examples only represent several embodiments of the present disclosure, and the descriptions thereof are specific and detailed, but should not be construed as limiting the scope of the present disclosure. It should be noted that several variations and modifications may be made by those skilled in the art without departing from the concept of the present disclosure, and the variations and modifications fall within the protection scope of the present disclosure. Therefore, the protection scope of the present disclosure shall be subject to the attached claims.

What is claimed is:

1. A method for image processing, comprising:
   operating a camera to acquire a target image in response to a first processor receiving an image acquisition instruction, wherein the target image comprises an infrared image and a speckle image, wherein operating the camera to acquire the target image in response to the first processor receivaing the image acquisition instruction comprises:
   operating, by the first processor, the camera to acquire the target image in response to receiving the image acquisition instruction, wherein operating, by the first processor, the camera to acquire the target image in response to receiving the image acquisition instruction comprises:
   operating, by the first processor, a first camera to acquire the infrared image and a second camera to acquire the speckle image in response to receiving the image acquisition instruction; and
   performing predetermined processing on the target image, wherein performing the predetermined processing on the target image comprises:
   sending, by the camera, the acquired target image to a second processor;
   obtaining, by the second processor, a depth image through calculation according to the target image and sending, by the second processor, the target image and the depth image to the first processor, the depth image being configured to represent depth information corresponding to the target image; and
   performing, by the first processor, face recognition processing according to the target image and the depth image, wherein a time interval between a first time point when the infrared image is acquired and a second time point when the speckle image is acquired is smaller than a first threshold.

2. The method according to claim 1, wherein operating, by the first processor, the camera to acquire the target image in response to receiving the image acquisition instruction comprises:
   obtaining, by the first processor, a time stamp contained in the image acquisition instruction;
   operating the camera to acquire the infrared image at a first time point, a time interval between the first time point and the time stamp being smaller than a second threshold; and
   operating the camera to acquire the speckle image at a second time point, a time interval between the second time point and the time stamp being smaller than a third threshold.

3. The method according to claim 1, wherein obtaining, by the second processor, the depth image through calculation according to the target image comprises:
   acquiring, by the second processor, a reference image, in which the reference image is an image with reference depth information obtained by calibration;
   comparing the reference image with the speckle image to obtain offset information, in which the offset information is configured to represent a horizontal offset of a speckle point in the speckle image relative to a corresponding speckle point in the reference image; and
   obtaining the depth image through calculation according to the offset information and the reference depth information.

4. The method according to claim 1, wherein obtaining, by the second processor, the depth image through calculation according to the target image and sending, by the second processor, the target image and the depth image to the first processor comprises:
   correcting, by the second processor, the infrared image and the speckle image to obtain a corrected infrared image and a corrected speckle image; and
   obtaining, by the second processor, the depth image through calculation according to the corrected speckle image, and sending, by the second processor, the corrected infrared image and the depth image to the first processor; and
   performing, by the first processor, the face recognition processing according to the infrared image and the depth image comprises:
   performing, by the first processor, the face recognition processing according to the corrected infrared image and the depth image.

5. The method according to claim 1, wherein performing, by the first processor, the face recognition processing according to the target image and the depth image comprises:
   detecting, by the first processor, a face image according to the infrared image, and performing, by the first processor, recognition processing on the face image; and
   performing, by the first processor, living-body detection processing according to the depth image and the infrared image.

6. The method according to claim 1, further comprising:
   obtaining an application level of an application initiating the image acquisition instruction, and obtaining an accuracy level corresponding to the application level; and
   adjusting an accuracy of at least one of the infrared image or the depth image according to the accuracy level, and sending at least one of the adjusted infrared image or the adjusted depth image to the application.

7. The method according to claim 6, wherein adjusting the accuracy of at least one of the infrared image or the depth image according to the accuracy level comprises at least one of:
   adjusting a resolution of at least one of the infrared image or the depth image according to the accuracy level; or
   adjusting a number of speckle points included in the speckle image according to the accuracy level, and obtaining the depth image according to the speckle image.

8. The method according to claim 6, further comprising:
   obtaining a safety level of the image acquisition instruction, and sending a face recognition result to the application via a data transmission channel corresponding to the safety level.

9. The method according to claim 1, wherein operating the camera to acquire the target image in response to the first processor receiving the image acquisition instruction comprises:
   operating, by the first processor, the camera to acquire the target image in response to receiving the image acquisition instruction sent by a second processor; and
   performing the predetermined processing on the target image comprises:
   acquiring a first image according to the target image; and
   sending the first image to a safety processor, obtaining a processing result by processing the first image with the safety processor, and sending the processing result to the second processor.

10. The method according to claim 9, wherein acquiring the first image according to the target image comprises:
    acquiring a reference speckle image with reference depth information;
    obtaining a matching result by matching the reference speckle image with the speckle image; and
    obtaining the first image according to the matching result, the first image being a parallax image with offset information of corresponding points in the speckle image and the reference speckle image.

11. The method according to claim 9, wherein acquiring the first image according to the target image comprises:
    acquiring a reference speckle image with reference depth information;
    obtaining a matching result by matching the reference speckle image with the speckle image; and
    obtaining the first image according to the reference depth information and the matching result, the first image being a depth image with depth information.

12. The method according to claim 9, further comprising:
    receiving a data obtaining request of an application, and obtaining a safety level of the application;
    searching for an accuracy level corresponding to the safety level; and
    adjusting an accuracy of the depth image according to the accuracy level, and sending the adjusted depth image to the application.

13. The method according to claim 9, further comprising:
receiving a data obtaining request of an application, and obtaining a safety level of the application;
determining a corresponding data transmission channel according to the safety level; and
sending the first image to the application via the corresponding data transmission channel.

14. The method according to claim 9, further comprising:
when the first processor receives the image acquisition instruction sent by the second processor in a first execution environment according to a verification request of an application, controlling the camera to acquire the infrared image and the speckle image according to the image acquisition instruction;
acquiring the depth image according to the speckle image, sending the acquired infrared image and the depth image to the safety processor, in which the safety processor compares the acquired infrared image with a stored infrared image, and compares the acquired depth image with a stored depth image to obtain a verification result, and sends the verification result to the second processor in the first execution environment; and
sending the verification result to a server corresponding to the application via a data safety transmission channel.

15. The method according to claim 1, wherein operating the camera to acquire the target image in response to the first processor receiving the image acquisition instruction comprises:
operating, by the first processor, the camera to acquire the target image in response to receiving the image acquisition instruction sent by a second processor; and
performing the predetermined processing on the target image comprises:
obtaining a corrected target image by correcting the target image; and
sending the corrected target image to the second processor, the corrected target image being applied to at least one of a face detection and an acquisition of depth information of a face.

16. The method according to claim 15, wherein the corrected target image comprises a corrected infrared image and a corrected speckle image; and performing the face detection according to the corrected target image comprises:
detecting whether a first face exists by performing a face recognition according to the corrected infrared image;
when the first face exists, obtaining a depth image according to the corrected speckle image; and
performing a living-body detection according to the corrected infrared image and the depth image.

17. An electronic device comprising a first processor and a camera, wherein the first processor is connected to the camera and is configured to operate the camera to acquire a target image in response to receiving an image acquisition instruction; and the electronic device performs predetermined processing on the target image,
wherein the target image comprises an infrared image and a speckle image, wherein operating the camera to acquire the target image in response to the first processor receiving the image acquisition instruction comprises:
operating, by the first processor, the camera to acquire the target image in response to receiving the image acquisition instruction, wherein operating, by the first processor, the camera to acquire the target image in response to receiving the image acquisition instruction comprises:
operating, by the first processor, a first camera to acquire the infrared image and a second camera to acquire the speckle image in response to receiving the image acquisition instruction;
wherein performing the predetermined processing on the target image comprises:
sending, by the camera, the acquired target image to a second processor;
obtaining, by the second processor, a depth image through calculation according to the target image and sending, by the second processor, the target image and the depth image to the first processor, the depth image being configured to represent depth information corresponding to the target image; and
performing, by the first processor, face recognition processing according to the target image and the depth image,
wherein a time interval between a first time point when the infrared image is acquired and a second time point when the speckle image is acquired is smaller than a first threshold.

18. A non-transitory computer readable storage medium having a computer program stored thereon, wherein when the computer program is executed by a processor, the computer program implements an image processing method, and the method comprises:
operating a camera to acquire a target image in response to a first processor receiving an image acquisition instruction, wherein the target image comprises an infrared image and a speckle image, wherein operating the camera to acquire the target image in response to the first processor receiving the image acquisition instruction comprises:
operating, by the first processor, the camera to acquire the target image in response to receiving the image acquisition instruction, wherein operating, by the first processor, the camera to acquire the target image in response to receiving the image acquisition instruction comprises:
operating, by the first processor, a first camera to acquire the infrared image and a second camera to acquire the speckle image in response to receiving the image acquisition instruction; and
performing predetermined processing on the target image, wherein performing the predetermined processing on the target image comprises:
sending, by the camera, the acquired target image to a second processor;
obtaining, by the second processor, a depth image through calculation according to the target image and sending, by the second processor, the target image and the depth image to the first processor, the depth image being configured to represent depth information corresponding to the target image; and
performing, by the first processor, face recognition processing according to the target image and the depth image,
wherein a time interval between a first time point when the infrared image is acquired and a second time point when the speckle image is acquired is smaller than a first threshold.

* * * * *